Aug. 29, 1967 R. H. HARNER ETAL 3,339,118

METAL ENCLOSED SWITCHGEAR WITH ONE OR MORE FUSES MOUNTED ON A DRAWER INTERLOCKED WITH INTERRUPTER SWITCH MEANS AND OPERATING MECHANISM THEREFOR

Filed Oct. 10, 1966

15 Sheets-Sheet 9

Aug. 29, 1967 R. H. HARNER ET AL 3,339,118

METAL ENCLOSED SWITCHGEAR WITH ONE OR MORE FUSES MOUNTED ON A DRAWER INTERLOCKED WITH INTERRUPTER SWITCH MEANS AND OPERATING MECHANISM THEREFOR

Filed Oct. 10, 1966

15 Sheets-Sheet 10

3,339,118
METAL ENCLOSED SWITCHGEAR WITH ONE OR MORE FUSES MOUNTED ON A DRAWER INTERLOCKED WITH INTERRUPTER SWITCH MEANS AND OPERATING MECHANISM THEREFOR

Robert H. Harner, Park Ridge, and Guenther G. Schockelt, Skokie, Ill., assignors to S & C Electric Company, Chicago, Ill., a corporation of Illinois Filed Oct. 10, 1966, Ser. No. 585,610
33 Claims. (Cl. 317—114)

ABSTRACT OF THE DISCLOSURE

For switching and over current protection for single phase and polyphase load circuits metal enclosed load current interrupting switches are mounted in a metal enclosure in series with drawer mounted fuses. Interlocks are arranged to prevent improver operation of the switches and access thereto and the fuses.

Figures 1, 2, 3:
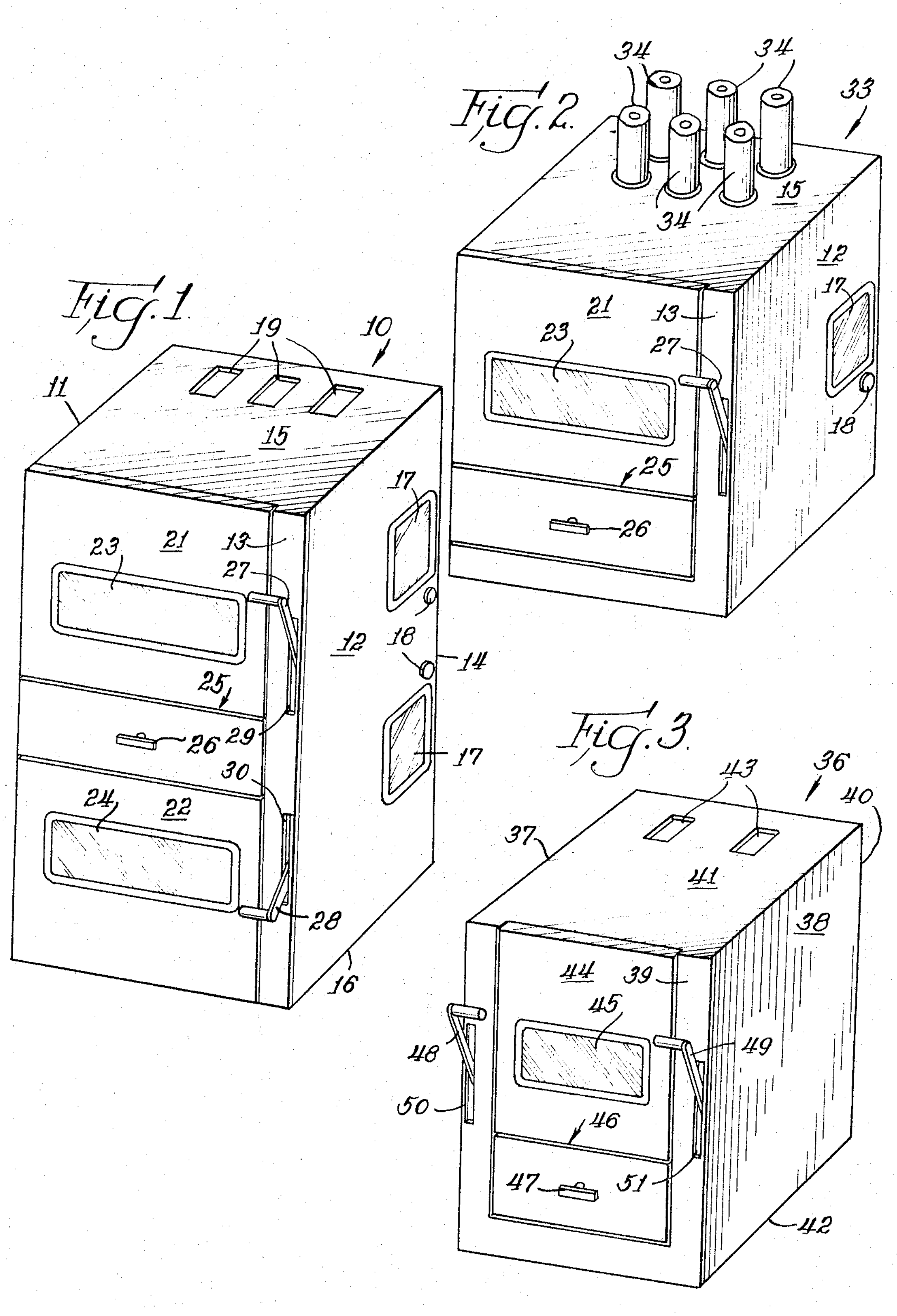

This invention relates to metal enclosed switchgear for use on single phase or polyphase alternating current circuits operating at voltages of the order of 15 kv. With suitable modification other voltages can be accommodated. This invention constitutes an improvement over the metal enclosed switchgear disclosed in applications Ser. No. 552,282, filed May 23, 1966, Ser. No. 558,165, filed May 23, 1966, and Ser. No. 561,839, filed June 30, 1966.

Among the objects of this invention are: In a new and improved manner to provide safe, efficient, economical and compact metal enclosed switchgear that can be variously applied but particularly for high rise buildings where space must be utilized to an exceptional extent; to employ for this purpose combinations of fuses and interrupter switches with operating mechanisms therefor arranged for untrained personnel to safely replace the fuses and operate the switches; to coordinate the load switching and circuit interrupting capabilities of the fuses and switches with the current carrying capacities of the various transformers employed for power distribution; to mount one or more fuses on a horizontally movable drawer in a metallic housing for movement into and out of circuit closed position with a load interrupter switch in series with each fuse; to interlock the drawer and to prevent its being opened if any switch occupies the closed position; to provide overcenter operating mechanism for shifting the switch or switches between closed and open circuit positions; to interlock the drawer and the overcenter operating mechanism to prevent operation of the latter if the drawer is open and prevent opening of the drawer if the operating mechanism occupies a switch closed position; to interlock the drawer and the switch or switches to permit opening of the drawer only when the switch or switches are open; to ground the feeder contact or contacts of the interrupter switch or switches and to interlock the switch blade or blades with a ground switch or switches to prevent closing the interrupter switch or switches when the feeder contact or contacts are grounded and to prevent grounding them when the interrupter switch or switches are closed; to provide for single phase or polyphase operation with selection of alternate feeder circuits or for loop feeder circuits, depending upon the available source and load requirements at the particular location; to arrange for polyphase switch operation under the control of an overcenter spring operating mechanism; to locate one polyphase switch and its operating mechanism above the fuse carrying drawer and another polyphase switch and its operating mechanism below the drawer, the drawer being interlocked with each switch and each operating mechanism; to mount two switch blades for individual rotation about a common axis with a common connection therefrom to a fuse in the drawer, the connection also providing a common bearing for the switch blades, there being an operating mechanism for each switch blade individually interlocked with the drawer; and to provide additional fuse containing drawers for additional load circuits to be supplied to the polyphase or single phase load interrupter switches as the case may be.

In accordance with this invention a metallic housing is provided that has horizontally movably mounted therein at least one drawer that carries one or more fuses connected in drawer closed position to one or more load contacts, depending upon the number of fuses present. The system may be either polyphase or single phase. Each fuse is fed from a feeder circuit through a load interrupter switch located in vertical spaced relation above or below the drawer. Alternate feeder circuits can be accommodated in which case the switches are located above and below the drawer for polyphase application. For single phase application, two independently operable switches are provided and arranged to rotate about a common horizontal axis with a common connection to one or more fuses depending upon the number of independent load circuits to be served. Loop circuits as well as independent feeder circuits can be employed. Each switch blade of each load interrupter switch is arranged not only to carry normal load current and fault current, but also is arranged to cooperate with arc extinguishing means to interrupt the arc incident to circuit opening. Depending upon the arrangement, the switch blades are independently or gang operated by an overcenter spring mechanism which facilitates the quick opening and closing movements of the switch blades. The drawer is interlocked with the switch operating mechanisms and the switch blades to prevent opening the drawer when the switch blades are closed and to permit opening of the drawer to inspect and change the fuse or fuses therein only when the switch blades are open. Grounding switches are arranged to be operated only by experienced personnel for grounding the feeder contacts. The grounding switches are interlocked with the switch blades to prevent operation of the former when the latter are closed and vice versa.

Figure 4:
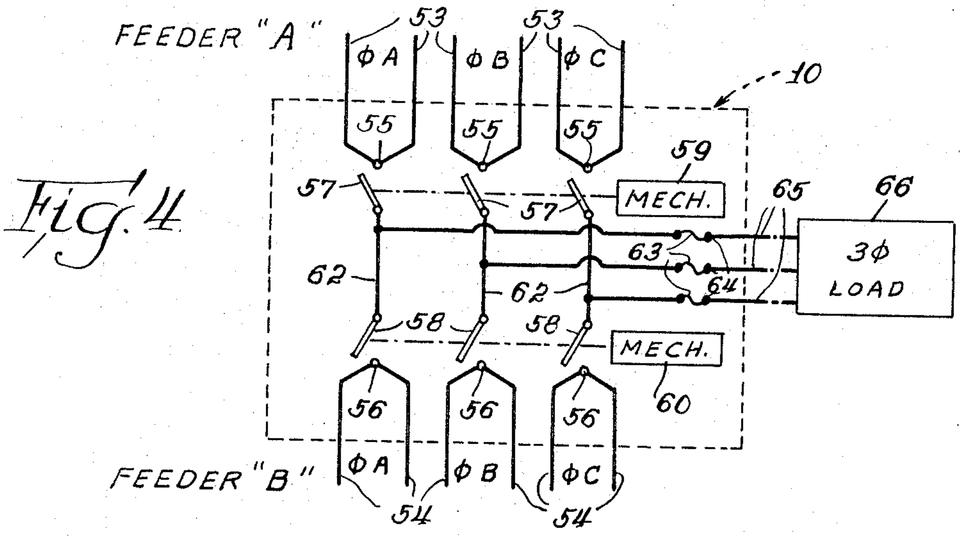
Figures 5, 6, 7:
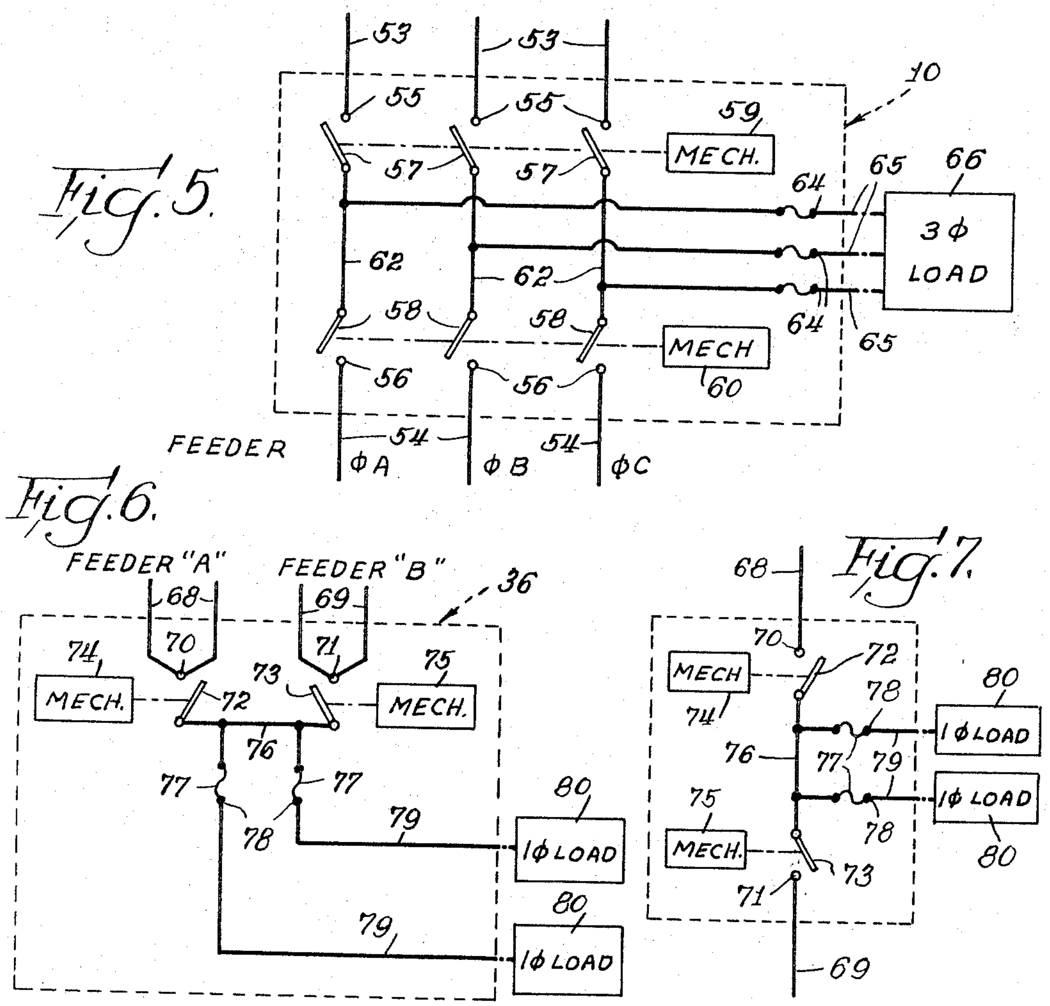
Figure 8A:
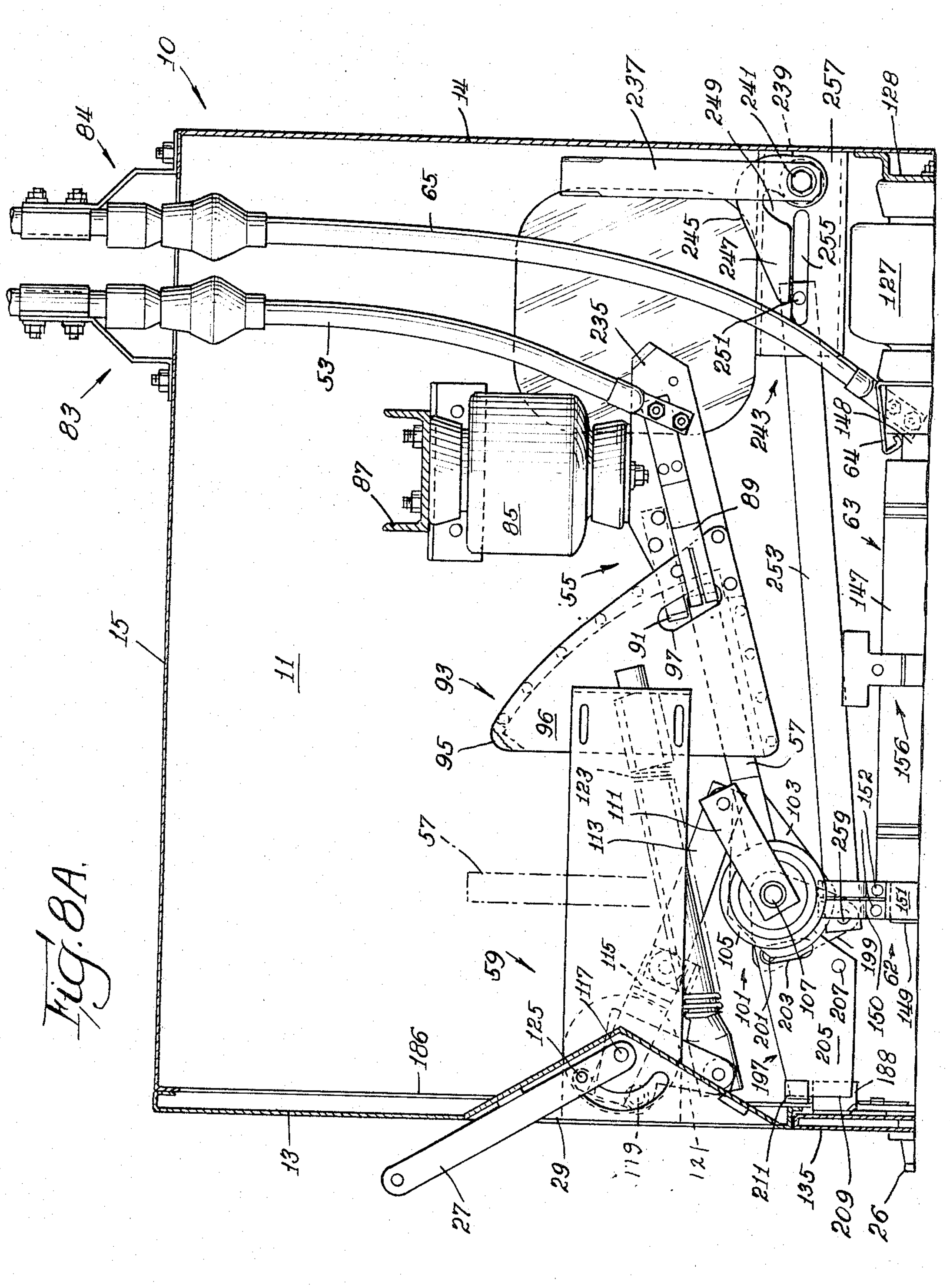
Figure 8B:
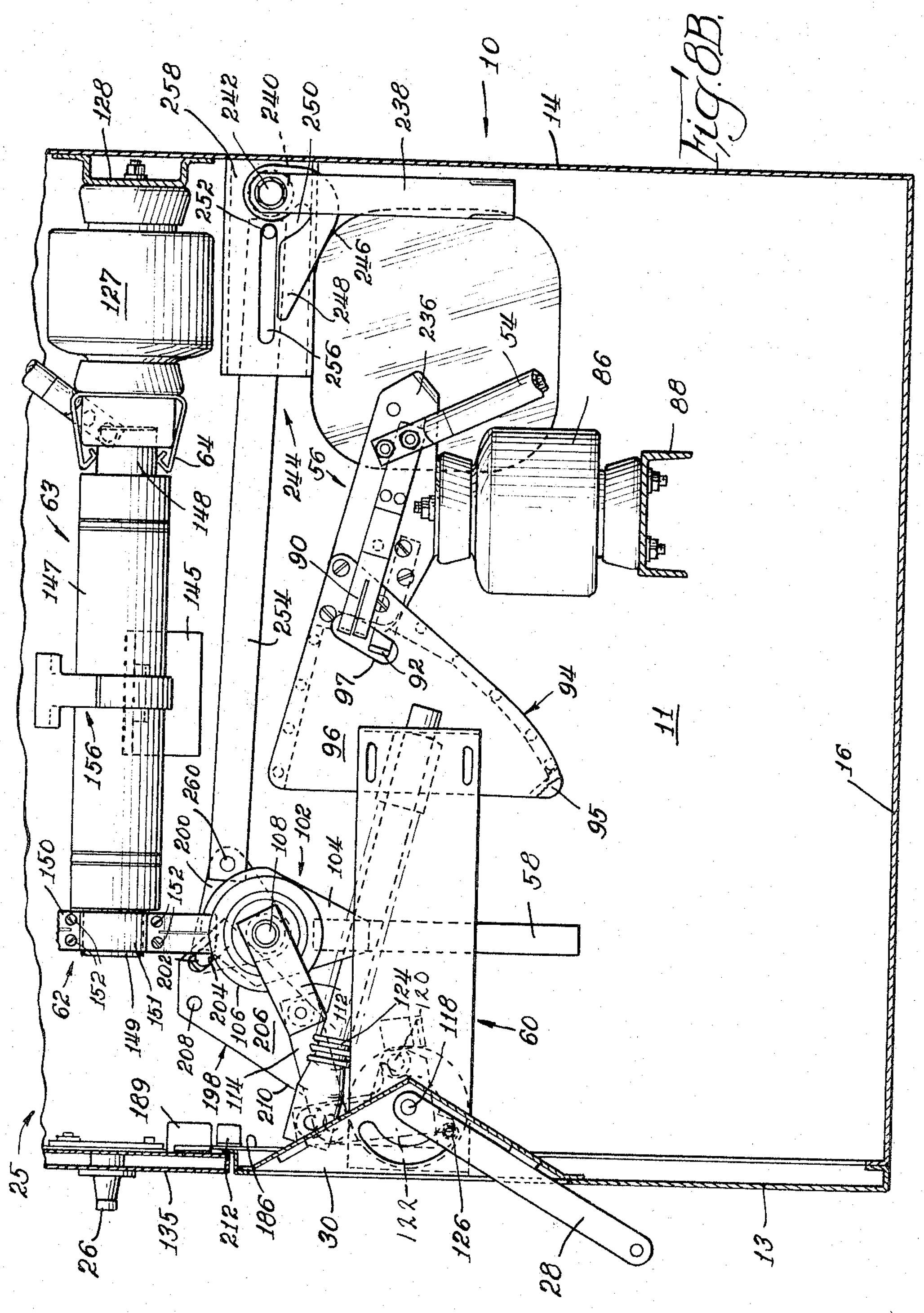
Figure 9:
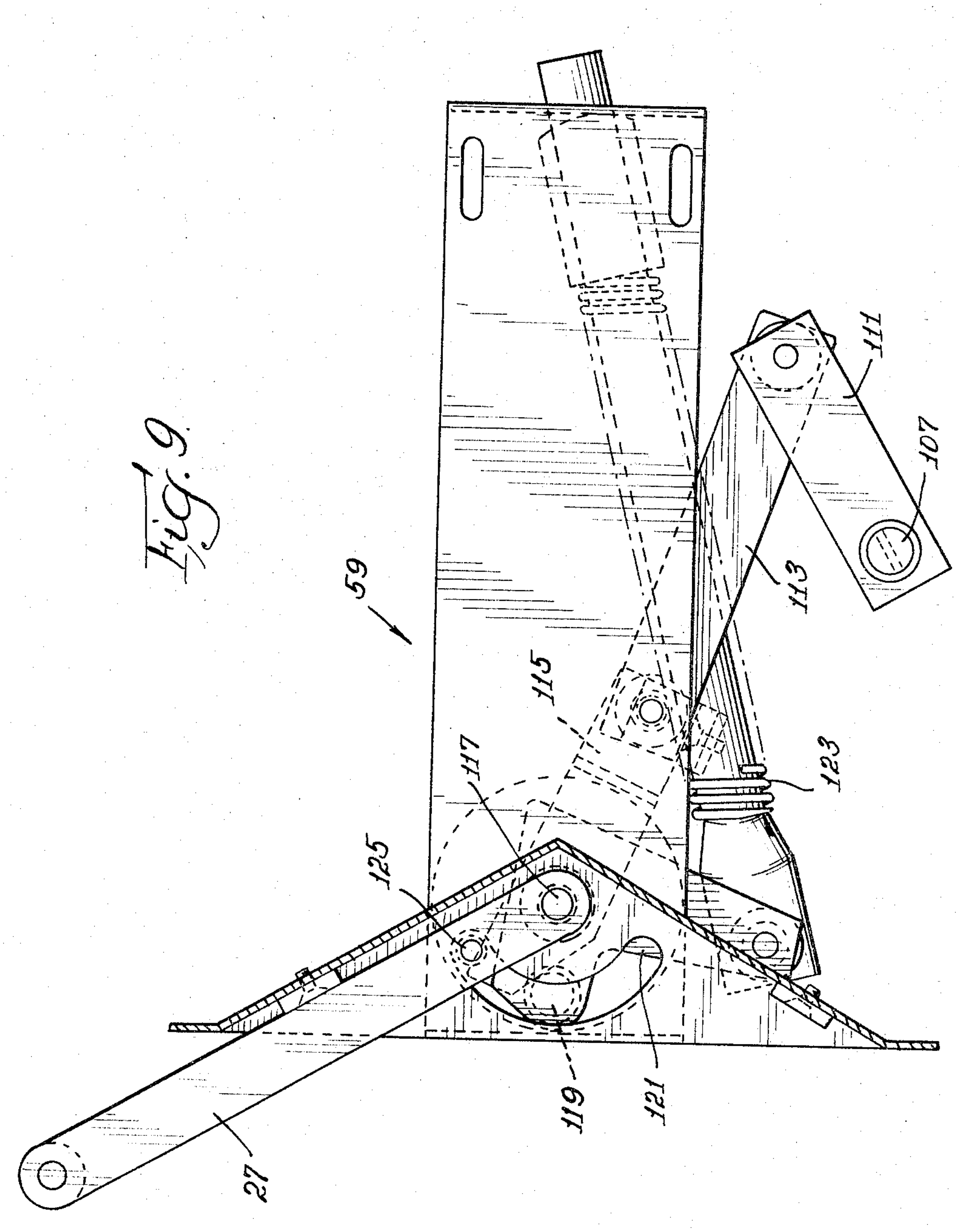
Figure 10:
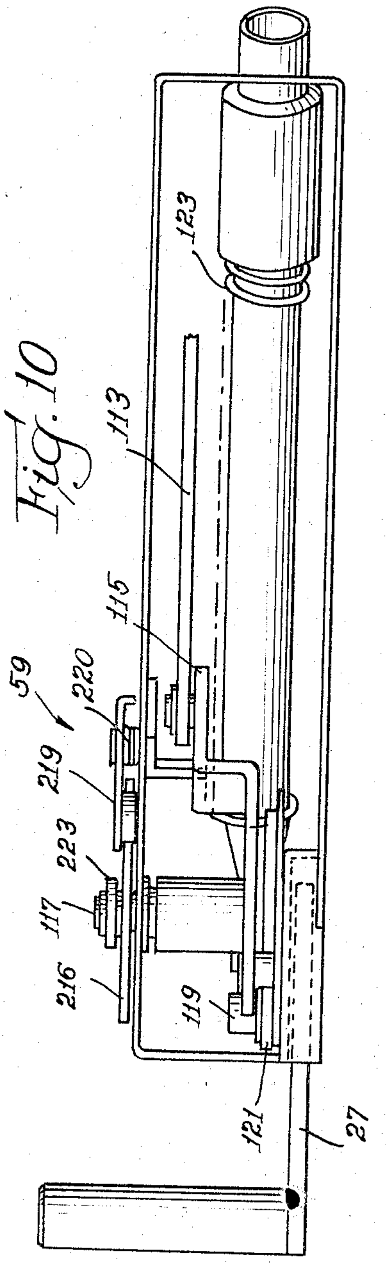
Figure 18:
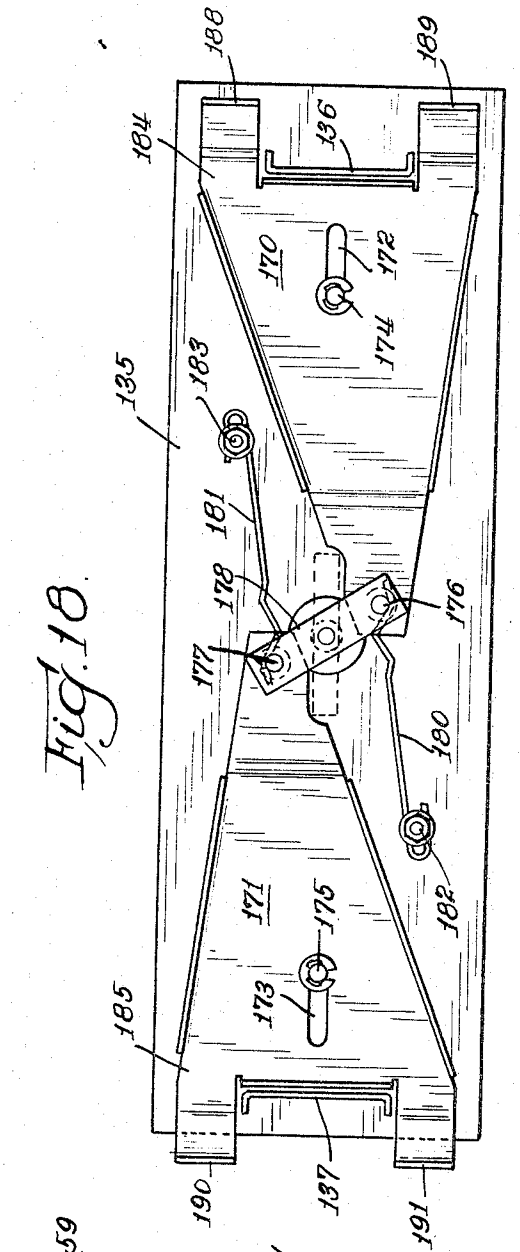
Figure 11:
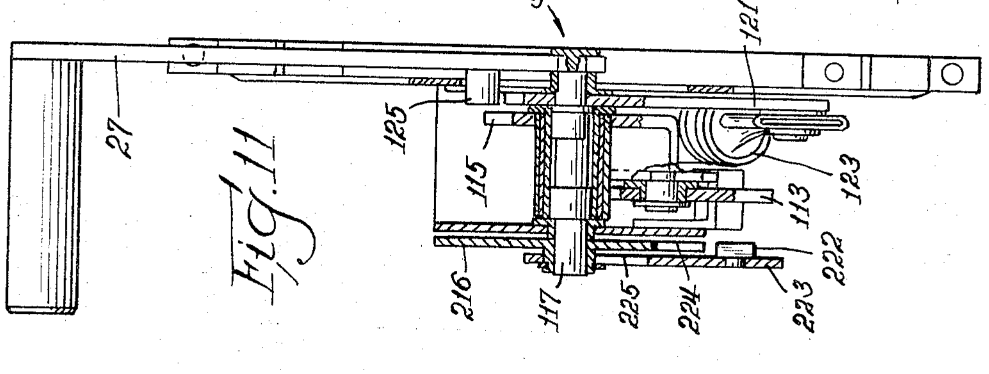
Figure 12:
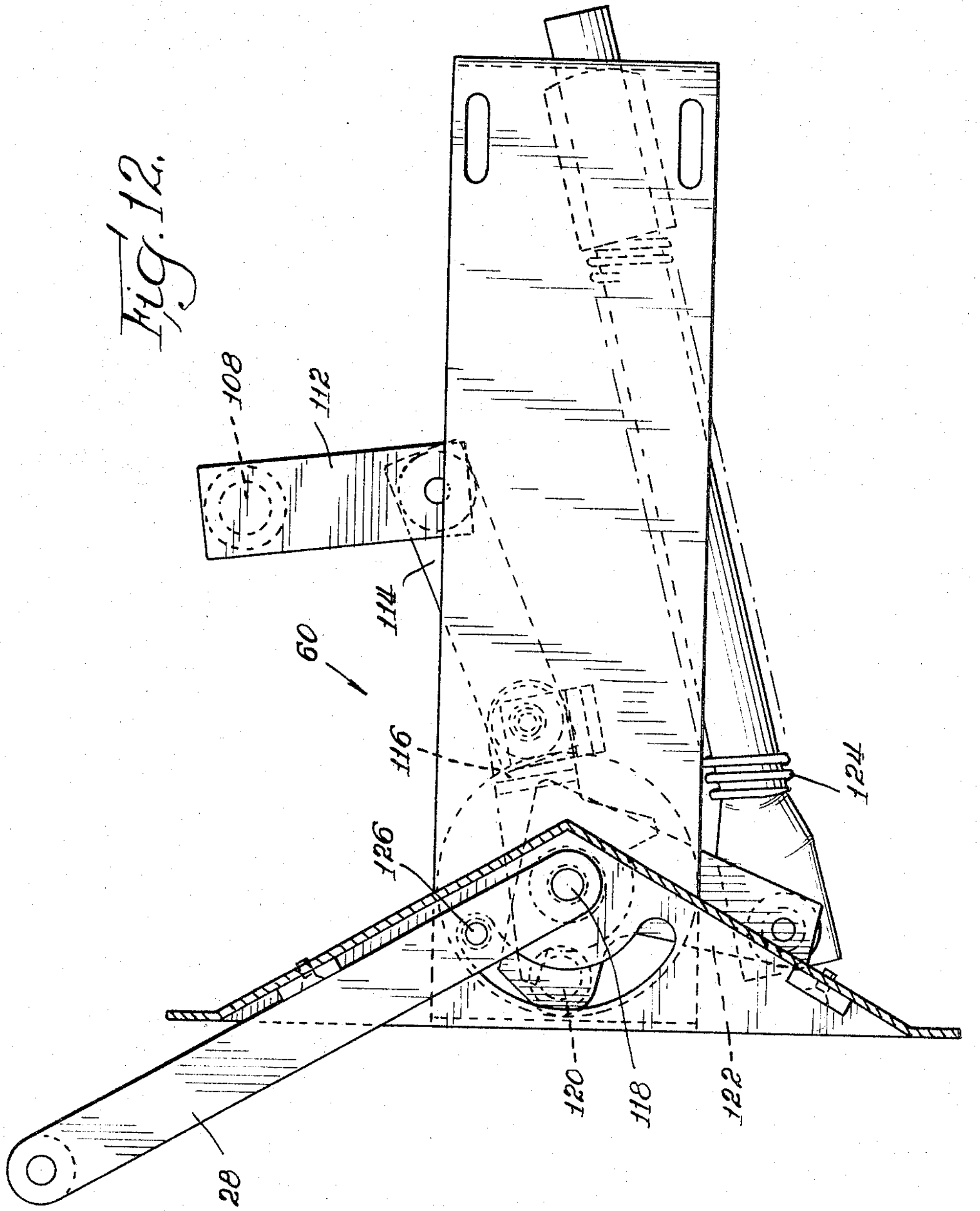
Figure 13:
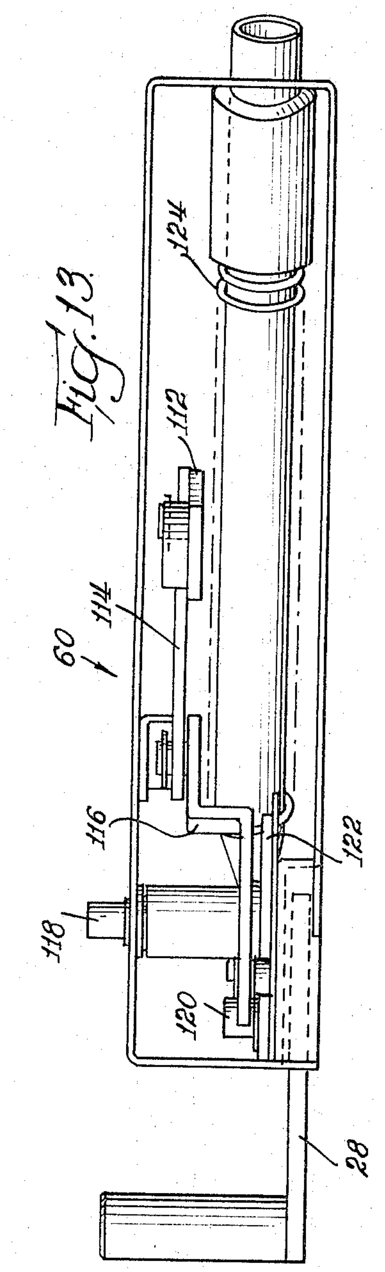
Figure 19:
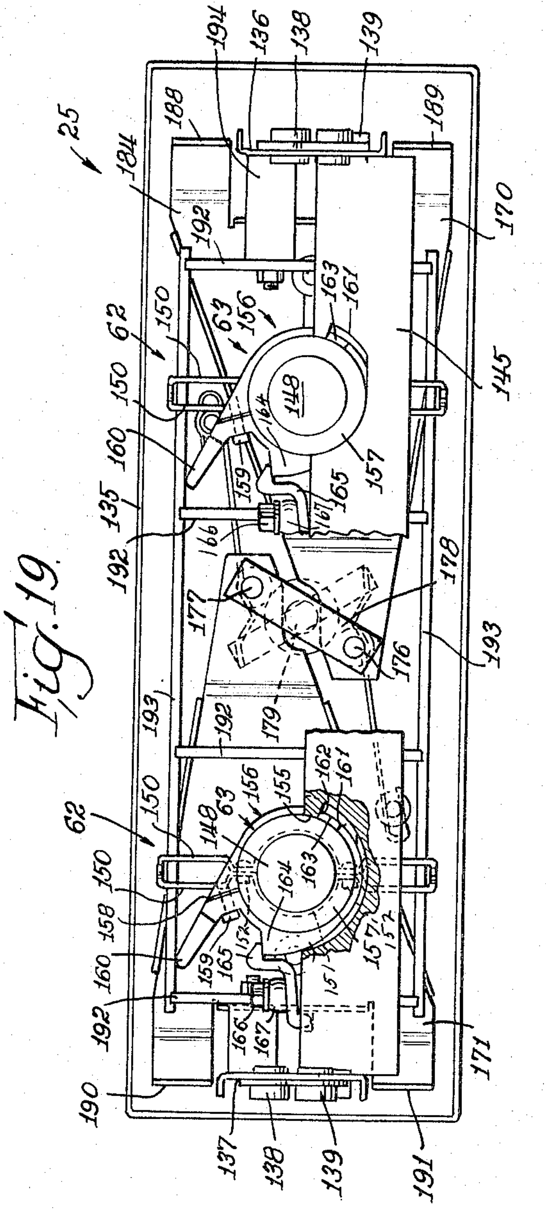
Figure 14:
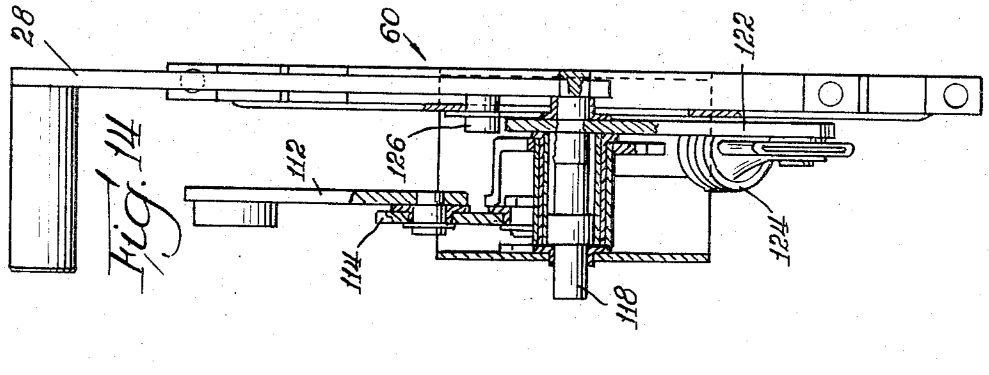
Figure 15:
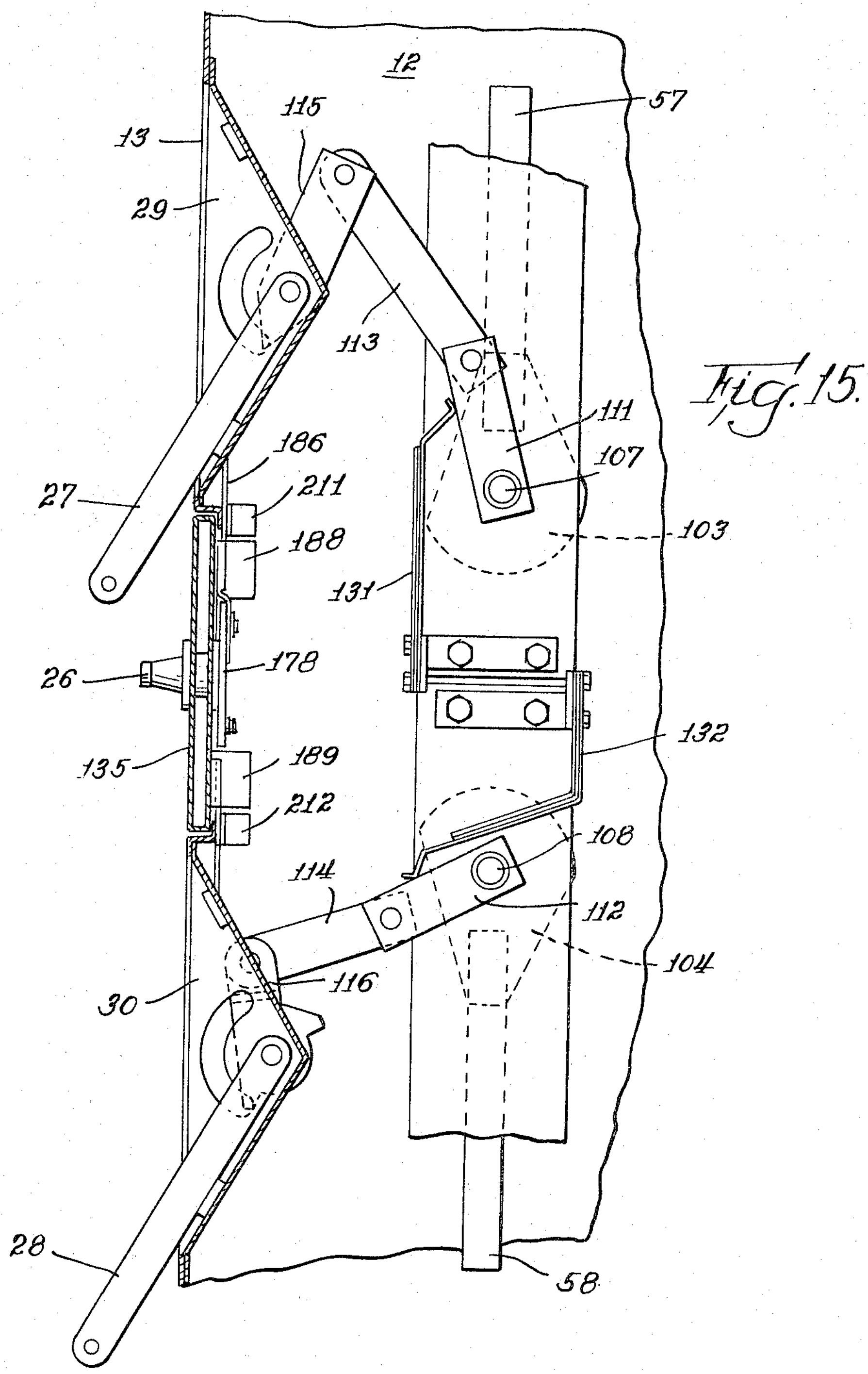
Figure 16:
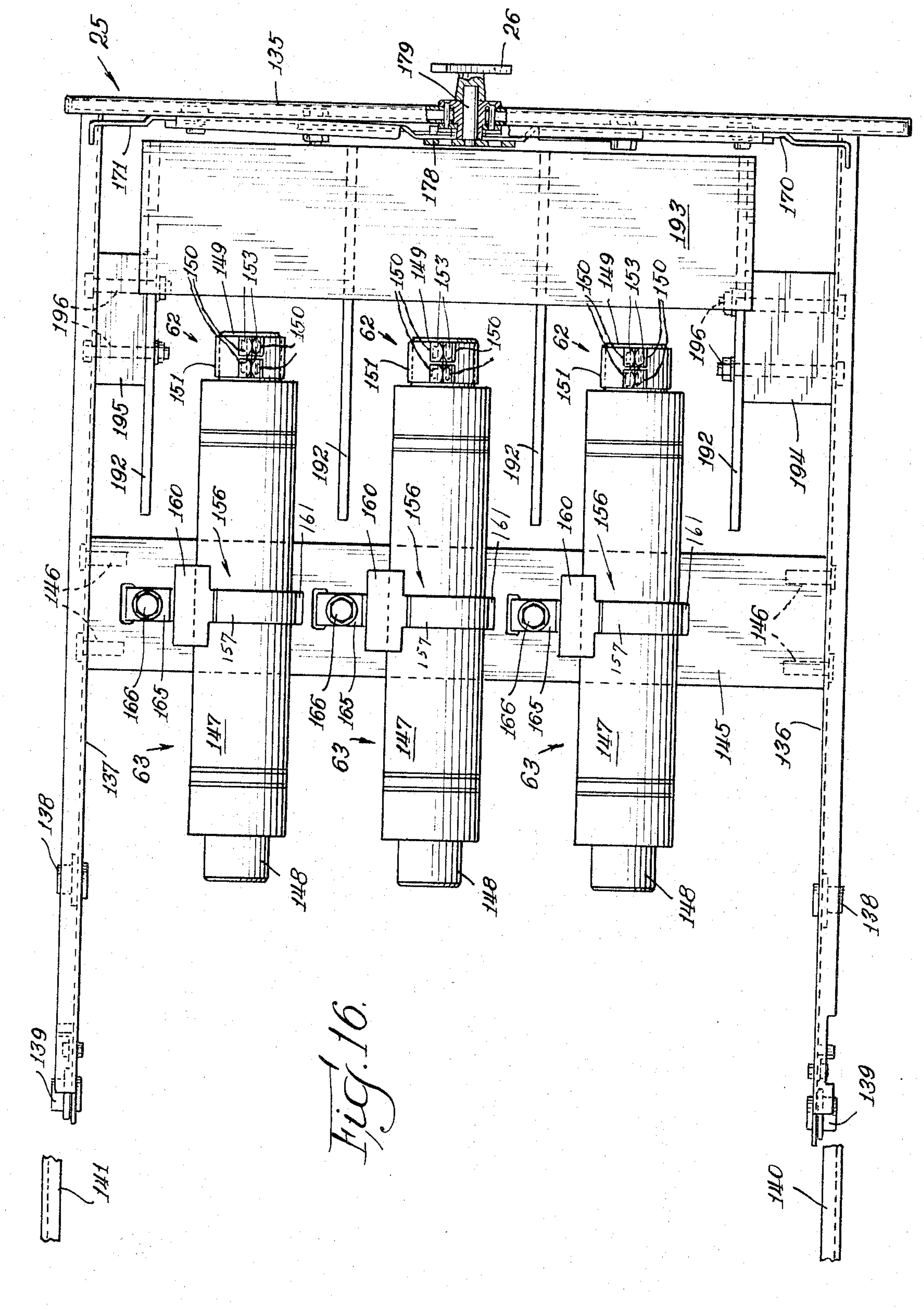
Figure 17:
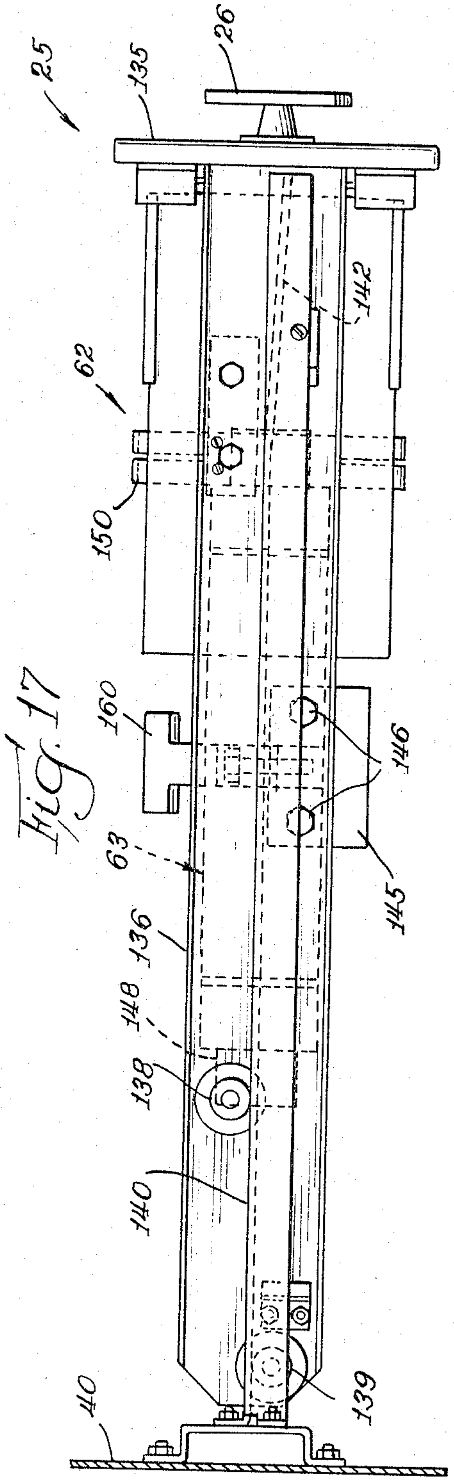
Figure 17A:
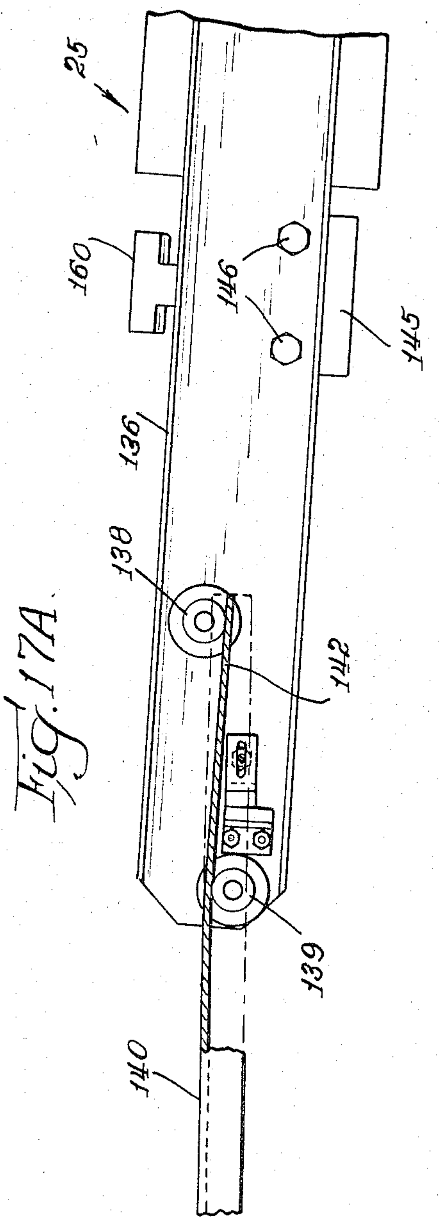
Figure 22:
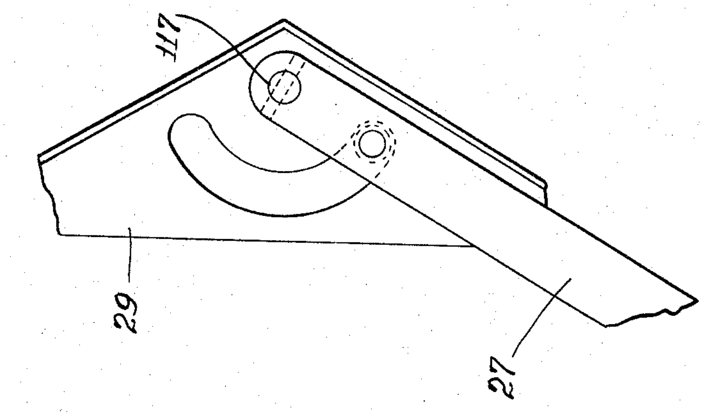
Figure 21:
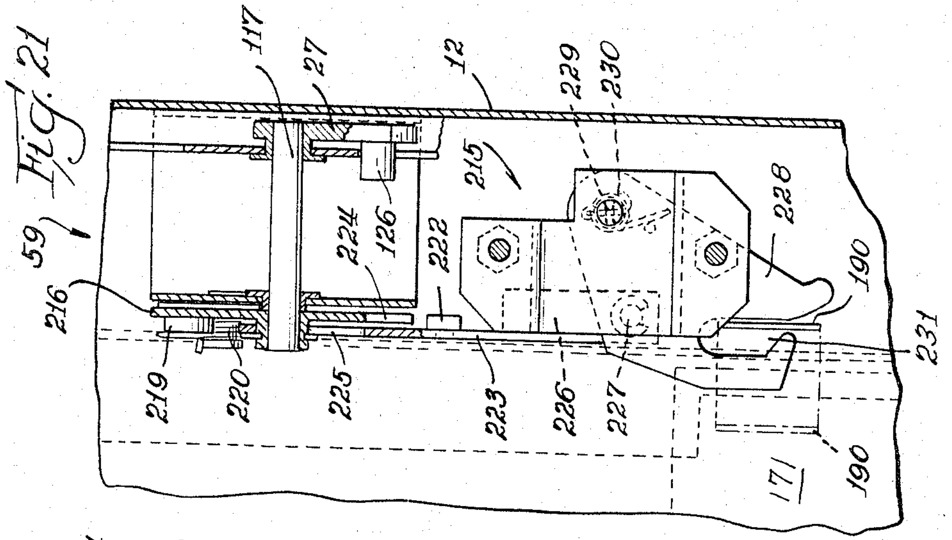
Figure 20:
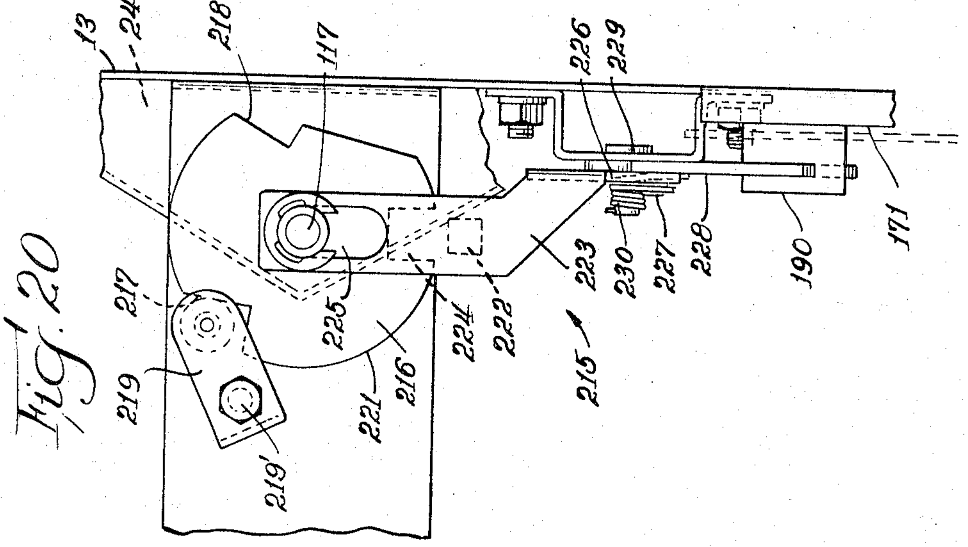
Figure 23:
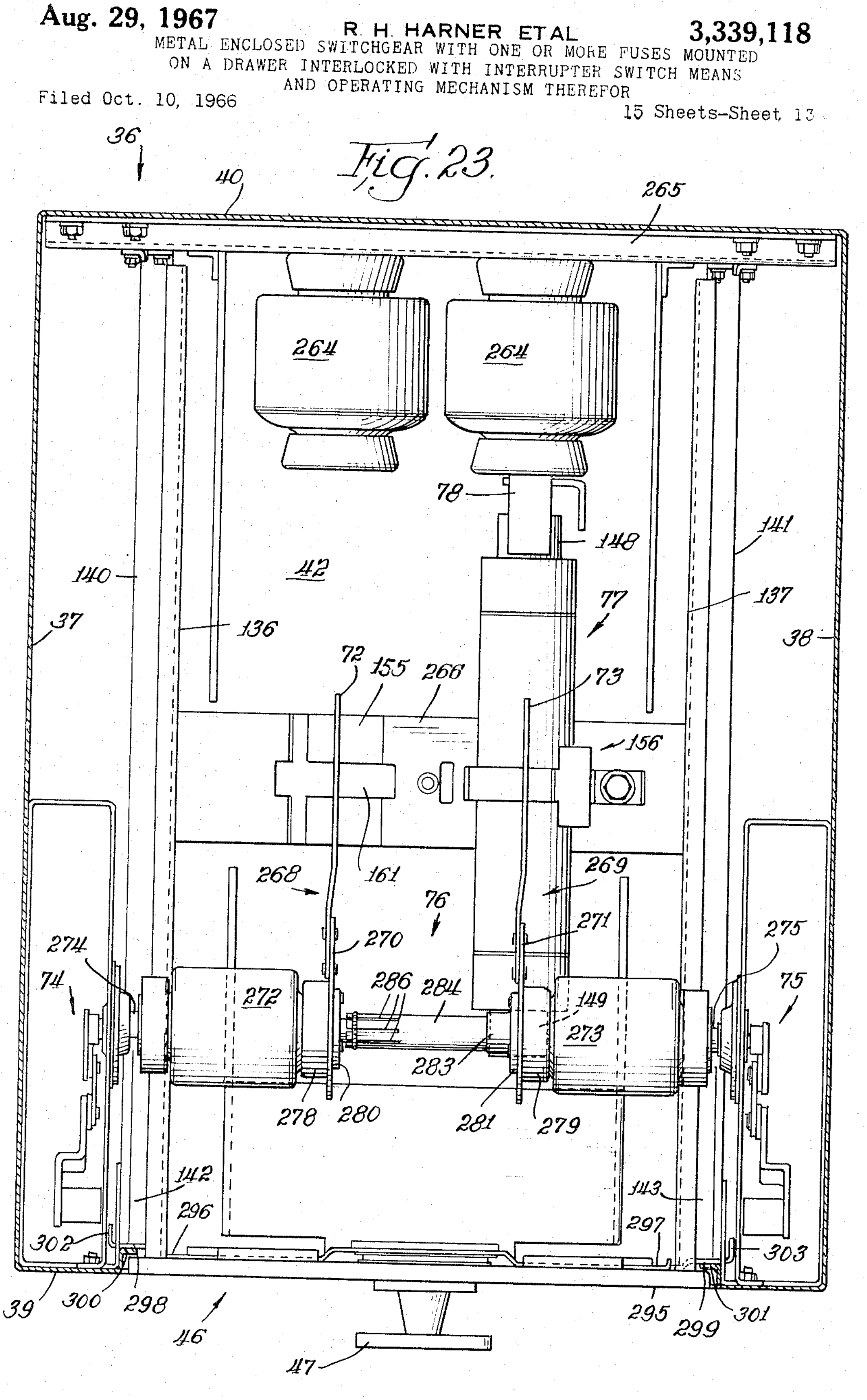
Figure 24:
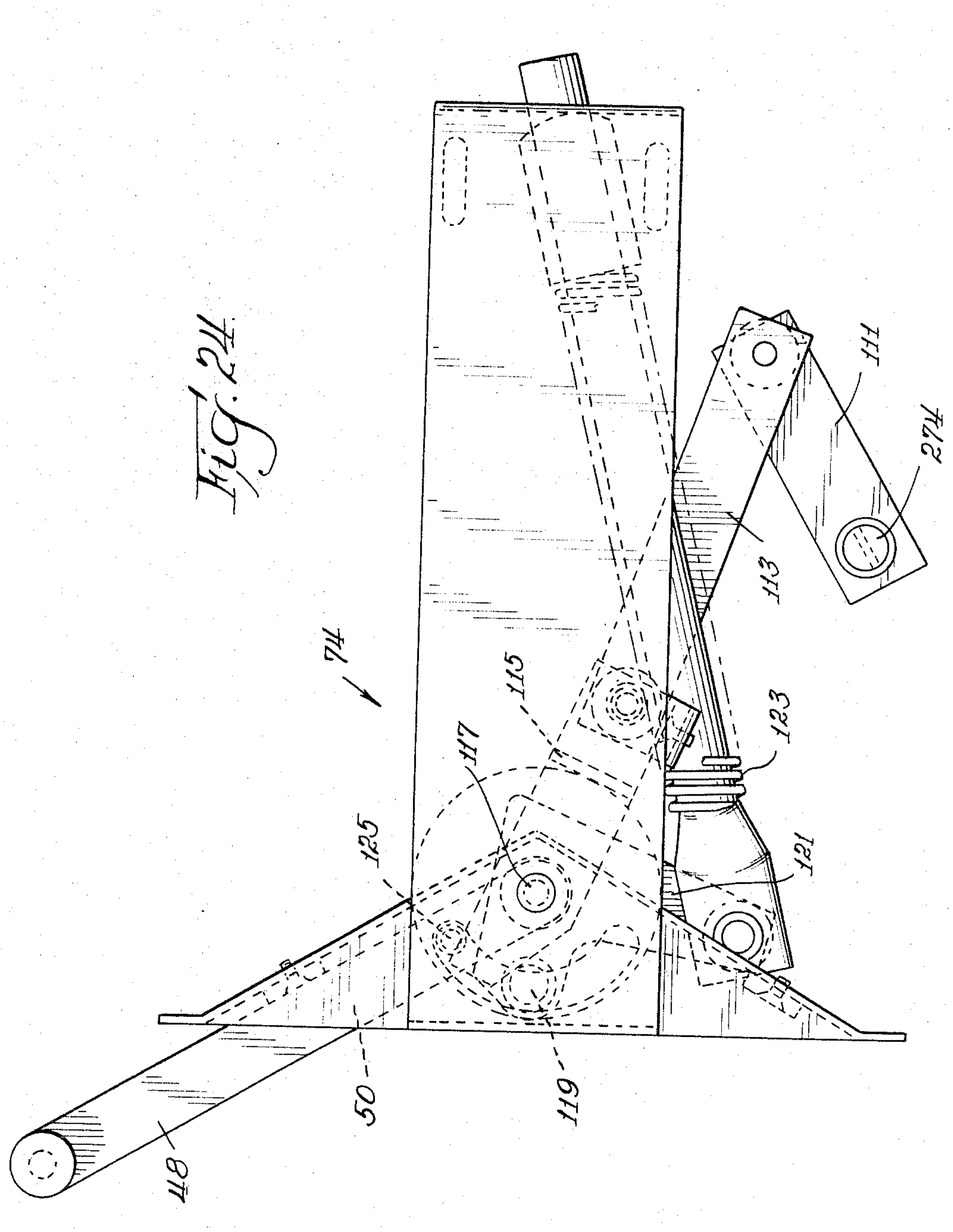
Figures 25, 26, 27:
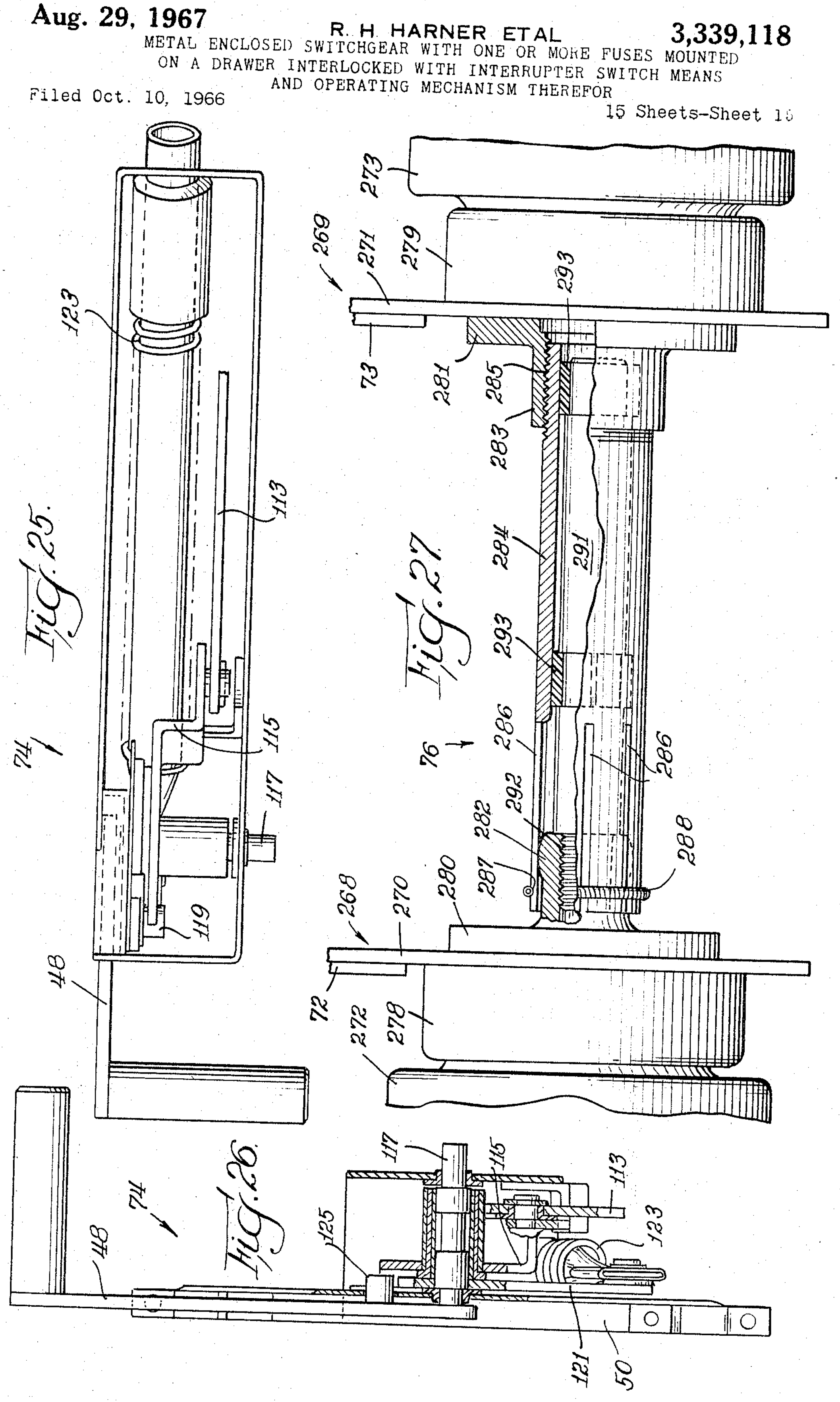

In the drawings: FIG. 1 is a perspective view of metal enclosed switchgear in which this invention is embodied, upper and lower manually operable handles being shown for operating upper and lower switch blades. FIG. 2 is a perspective view of another embodiment of the invention in which only the upper manually operable handle is shown for use in conjunction with upper switch blades. FIG. 3 is a perspective view of another embodiment of the metal enclosed switchgear employing left and right manually operable handles for individually operating left and right switch blades for selectively connecting a load circuit to either of two circuits. FIG. 4 illustrates, diagrammatically, the switch connections that can be employed in conjunction with the metal enclosed switchgear shown in FIG. 1. FIG. 5 illustrates, diagrammatically, alternate circuit arrangements for a loop feed system that can be employed in conjunction with the embodiment of the invention shown in FIG. 1. FIG. 6 illustrates diagrammatically the circuit connections that can be employed in connection with the metal enclosed switchgear shown in FIG. 3. FIG. 7 illustrates, diagrammatically, alternate circuit connections that can be employed in conjunction with the metal enclosed switchgear shown in FIG. 3. FIGS. 8A–8B taken together with the former placed above the latter show certain of the interior details of construction of the metal enclosed switchgear shown in FIG. 1, the view being taken inside the right side wall. FIG. 9 is a view, partly in side elevation and partly in section, showing the upper operating mechanism for the metal enclosed switchgear shown in FIG. 1. FIG. 10 is a top plan view of the operating mechanism shown in FIG. 9. FIG. 11 is a view, in end elevation, certain parts being shown in section, of the operating mechanism shown in FIGS. 9 and 10. FIG. 12 is a view, in side elevation, of the lower operating mechanism for the metal enclosed switchgear shown in FIG. 1, certain parts being shown in section. FIG. 13 is a top plan view of the operating mechanism shown in FIG. 12. FIG. 14 is a view, in end elevation with certain parts being shown in section, of the lower operating mechanism shown in FIGS. 12 and 13. FIG. 15 is a view, in side elevation with certain parts being shown in section, of the upper and lower manually operable handles for the upper and lower switch operating mechanisms together with the associated linkages. FIG. 16 is a top plan view of the fuse drawer employed in the metal enclosed switchgear shown in FIG. 1. FIG. 17 is a view, in side elevation, of the fuse drawer shown in FIG. 16. FIG. 17A shows a portion of the fuse drawer in the open position to illustrate how it is arranged to slope downwardly in this position. FIG. 18 (sheet 6) is a view in elevation of the front wall of the fuse drawer looking from left to right in FIG. 16 or FIG. 17. FIG. 19 (sheet 8) is an end view of the fuse drawer shown in FIG. 16, looking from left to right, certain parts being shown in section in order to illustrate more clearly certain details of construction. FIG. 20 is a view, in side elevation, of the interlocking means between the fuse drawer and the upper operating mechanism. FIG. 21 is a view, in front elevation, of the interlocking means shown in FIG. 20, certain parts being shown in section. FIG. 22 is a view, in side elevation, of a portion of the upper manually operable handle and the slot providing means therefor. FIG. 23 is a top plan view of the fuse drawer employed in the metal enclosed switchgear shown in FIG. 3 and illustrating how it is mounted in the metallic housing which is shown in section. FIG. 24 is a view, in side elevation, of the left operating mechanism employed in the metal enclosed switchgear shown in FIG. 3. FIG. 25 is a top plan view of the operating mechanism shown in FIG. 24. FIG. 26 is a view, in front elevation, with certain parts being shown in section, of the operating mechanism shown in FIGS. 24 and 25. FIG. 27 is a view, at an enlarged scale, of the common connection shown in FIG. 23 between the independently operable switch blades of the metal enclosed switchgear shown in FIG. 3.

In FIG. 1 a metallic housing is indicated, generally, at 10 and is arranged to accommodate a three-phase system that may be connected as illustrated diagrammatically in FIGS. 4 and 5. The metallic housing 10 comprises left and right side walls 11 and 12 and front and rear walls 13 and 14. Also it includes top and bottom walls 15 and 16. Windows 17 are provided in the right side wall 12 and similar windows can be provided in the left side wall 11 for the purpose of permitting inspection of the position and condition of the mechanism within the metallic housing 10, particularly the ground switches to be described. Cover and ground switch locking plates 18 are inserted in the side wall 12 to permit access to the ground switches. Openings 19 are formed in the top wall 15 for the entry of high voltage cables. Similar openings are provided in the bottom wall 16 for entry of high voltage cables also.

The front wall 13 is relatively narrow since upper and lower panels 21 and 22 are employed for closing the front side of the metallic housing 10 in addition to the front wall 13. They are removable only from the inside of the housing 10. Upper and lower windows 23 and 24 are provided in the upper and lower panels 21 and 22 to permit inspection of the interior of the housing 10 and particularly of the condition and the positions of the switch blades and the switch blade assemblies to be described.

Between the upper and lower panels 21 and 22 there is slidably mounted a fuse drawer that is indicated, generally, at 25. It is provided with a fuse drawer latch operating handle 26 that is arranged not only to lock and unlock the fuse drawer 25 to and from the metallic housing 10 but also it is arranged to cooperate with the switch and operating mechanisms within the metallic housing 10 in such manner that the drawer 25 can be opened only when the switch blades are in the open positions and the operating mechanisms occupy corresponding positions.

For operating upper and lower switch assemblies in the metallic housing 10 upper and lower manually operable handles 27 and 28 are employed. They are arranged to extend through upper and lower slots 29 and 30 in the front wall 13 and to cooperate with operating mechanisms to be described. The upper handle 27 is shown in a position corresponding to the closed position of the associated switch blade assembly and the lower handle 28 is shown in a position corresponding to the open position of the associated switch blade assembly.

In FIG. 2 a metallic housing is indicated, generally, at 33 and it is modified from the metallic housing 10 as shown in FIG. 1 by the omission of the lower portion and the lower manually operable handle 28 together with the associated operating mechanism and switch blade assembly. Where possible the same reference characters are employed. In FIG. 2 cable terminating the wall bushings 34 are employed for passage of the line and load conductors through the top wall 15. Other suitable arrangements can be employed as may be desirable.

A single-phase switching assembly is illustrated in FIG. 3 and the circuit connections therein may be as illustrated in FIGS. 6 and 7. Here a metallic housing is indicated, generally, at 36 and it includes left and right side walls 37 and 38, front and rear walls 39 and 40 and top and bottom walls 41 and 42. Openings 43 are formed in the top wall 41 for the high voltage conductors and similar openings may be formed in the bottom wall 42. The front wall 39 is generally U-shaped and between the upstanding arms there is a panel 44 that is similar to the panel 21 or 22 in FIG. 1 and it can be removed only from the interior of the metallic housing 36. A window 45 is provided in the panel 44. Below the panel 44 there is slidably mounted a fuse drawer 46 which has a fuse drawer operating handle 47, the construction being similar to the fuse drawer 25 and handle 26. In this embodiment left and right manually operable handles 48 and 49 are arranged to operate in left and right slots 50 and 51 in the front wall 39 for independently operating mechanisms associated therewith for moving the switch blade assemblies individual thereto between the switch closed and switch open positions. As before, the up-positions of the operating handles 48 and 49 correspond to switch closed positions while the down-positions thereof correspond to the switch open positions.

The metallic housings 10, 33 and 36 are ventilated by the provision of suitable louvers (not shown) in the walls thereof to permit circulation of air therethrough. Their rear walls 14 and 40 have removable panels (not shown) to permit access to the interior for assembly and servicing purposes.

FIG. 4 ilustrates one circuit arrangement that can be employed in the metallic housing 10 in FIG. 1. It shows a three-phase primary selector switching system for a three-phase load. Upper and lower feeder conductors 53 and 54 are illustrated as entering and leaving the metallic housing 10 and connected, respectively, to upper and lower feeder contacts 55 and 56. Upper and lower feeder switch blades 57 and 58 are arranged to engage and disengage, respectively, the upper and lower feeder contacts 55 and 56. Upper and lower operating mechanisms 59 and 60 are connected in a manner to be described for operating, respectively, the upper and lower feeder switch blades 57 and 58. It will be understood that the upper and lower manually operable handles 27 and 28 are associated, respectively, with the upper and lower operating mechanisms 59 and 60. Common connections 62 are employed between the corresponding feeder switch blades 57 and 58 for connecting them to fuses 63 which are located in the fuse drawer 25. The fuses 63 can be of any suitable type such as current-limiting fuses, boric acid fuses, or the like. At one end, each of the fuses 63 is connected to one of the common connections 62 while at the other ends they are connected to individual load contacts 64 which are connected by load conductors 65 to a three-phase load 66 which may be of any suitable type.

In FIG. 4, on closure of either the upper feeder switch blades 57 or the lower feeder switch blades 58, the three-phase load 66 is supplied from either the upper feeder conductors 53 or the lower feeder conductors 54. It will be understood that the upper and lower feeder conductors 53 and 54 are not commonly externally interconnected, the arrangement being such that the three-phase load 66 can be supplied from either set and generally not from both sets. Also, it is possible to transfer from the upper feeder conductors 53 to the lower feeder conductors 54 by first closing the lower feeder switch blades 58 and then opening the upper feeder switch blades 57 or vice versa.

FIG. 5 shows a three-phase loop feeder circuit for supplying the three-phase load 66. Such a circuit arrangement can be employed in the metallic housing 10. Only a single set of upper feeder conductors 53 and a single set of lower feeder conductors 54 are employed. In this circuit arrangement it is possible to supply the three-phase load 66 from either the upper or the lower feeder conductors 53 or 54 or to feed therebetween depending upon the operation of the upper and lower feeder switch blades 57 and 58.

FIG. 6 shows the circuit connections that can be employed in the metallic housing 36 for a single-phase system. Here left and right feeder conductors 68 and 69 are employed to provide a single-phase primary selective switching system for one or more single-phase loads. The left feeder conductors 68 enter and leave the metallic housing 36 with a common connection at 70 to a left feeder contact. In a similar manner right feeder conductors 69 enter and leave the metallic housing 36 and are commonly connected at a right feeder contact 71. Switch blades 72 and 73 are operable independently by operating mechanisms 74 and 75 for selective engagement with the left or right feeder contacts 70 or 71 as may be desired. It will be understood that the operating mechanisms 74 and 75 are under the control of manually operable handles 48 and 49, FIG. 3. In order to permit feeding one or more loads from either the feeder conductors 68 or the feeder conductors 69 a common connection 76 is formed between the switch blades 72 and 73 in a manner to be described. One or more fuses 77 can be connected to the common connection 76. They are located in the fuse drawer 46, FIG. 3, and are arranged to be connected to load contacts 78 which are connected by conductors 79 to single-phase loads indicated at 80. While only two fuses 77 are illustrated here, it will be understood that more than two fuses and load circuits can be supplied. Also, more than one drawer 46 can be provided with a suitable interlocking where such an arrangement is desired. It will be understood that the single-phase loads 80 can be supplied from either the feeder conductors 68 or the feeder conductors 69, depending upon the positions of the feeder switch blades 72 and 73. Also it is possible to shift the loads 80 from one feeder conductor 68 to the other feeder conductor 69 by first closing the other switch blade and thereafter opening the one switch blade and vice versa.

FIG. 7 shows a single-phase loop switching system for supplying one or more single-phase loads 80 using the switch blades 72 and 73, operating mechanisms 74 and 75 therefor, and the fuses 77 of FIG. 6. In FIG. 7 only single conductors 68 and 69 are employed selectively for energizing one or more single phase loads 80 from the conductors 68 and 69 of a loop circuit.

FIGS. 8A–8B show, generally, in side elevation the interior of the metallic housing 10 inside the right side wall 12 with the details of construction of the fuse drawer 25 and tracks therefor omitted. The circuit connections may be as illustrated in FIG. 4 or FIG. 5. In FIG. 8A the incoming and outgoing upper feeder conductors 53 and the outgoing load conductors 65 are shown as extending through the top wall 15 where mounting assemblies 83 and 84 are arranged to support them. The incoming and outgoing lower feeder conductors 54 extend through the bottom wall 16 and are similarly supported by suitable means (not shown).

In FIGS. 8A–8B the upper and lower feeder contacts 55 and 56 of each phase are mounted, respectively, on upper and lower insulators 85 and 86 which are carried by upper and lower transverse channels 87 and 88 that extend between the side walls 11 and 12 of the metallic housing 10. Upper and lower switch contacts 89 and 90 are carried by the upper and lower feeder contacts 55 and 56 and they are arranged to have contact engagement with the feeder switch blades 57 and 58, respectively. Associated with the upper and lower switch contacts 89 and 90 are upper and lower arcing contacts 91 and 92 which, as shown, are also connected to the upper and lower feeder contacts 55 and 56. For extinguishing arcs drawn on opening movement of the upper and lower feeder switch blades 57 and 58, upper and lower arc chutes 93 and 94 are employed and are individually mounted on the upper and lower feeder contacts 55 and 56. The arc chutes 93 and 94 are of a similar construction and each comprises a pair of plates 95 and 96 of suitable insulating material that is capable of evolving a gaseous arc extinguishing medium when subjected to the heat of an electric arc. Between the plates 95 and 96 there is a slot through which the respective switch blades 57 and 58 move. A slot 97 is formed in each of the plates 95 and 96 of each arc chute 93 and 94 to permit the escape readily of gas pressure that may be developed therebetween. The ends of the upper and lower switch contacts 89 and 90 and the ends of the upper and lower arcing contacts 91 and 92 extend through the slots 97 to engage the respective upper and lower feeder switch blades 57 and 58.

The upper and lower feeder switch blades 57 and 58 form parts of upper and lower switch blade assemblies that are indicated, generally, at 101 and 102. These switch blade assemblies also include upper and lower metallic switch blade support plates 103 and 104 that extend radially for sliding contact engagement with the common connections 62 which are arranged, as shown in FIGS. 4 and 5, to interconnect the feeder switch blades 57 and 58 with the fuses 63. For a three-phase switch blade assembly there are provided four upper and four lower insulators 105 and 106 for each of the switch blade assemblies 101 and 102 with the switch blade support plates 103 and 104 being located between adjacent insulators and supported thereby for rotation between open and closed positions. Upper and lower stub shafts 107 and 108 are provided at the ends of the switch blade assemblies 101 and 102 and are connected to the insulators 105 and 106 for rotation therewith. The stub shafts 107 and 108 are suitably journaled on the side walls 11 and 12 of the metallic housing 10.

For rotating the switch blade assemblies 101 and 102 between the switch closed and the switch open positions, upper and lower switch blade operating arms 111 and 112 are secured to the stub shafts 107 and 108 at one end and are pivotally connected by upper and lower connecting links 113 and 114 (FIG. 12) to upper and lower spring operated arms 115 and 116 that are rotatably mounted on upper and lower mechanism shafts 117 and 118 which form parts, respectively, of the upper and lower operating mechanisms 59 and 60. Driving pins 119 and 120 are carried, respectively, by upper and lower spring levers 121 and 122, which are rotatably mounted on the upper and lower mechanism shafts 117 and 118 and they have connected thereto upper and lower overcenter springs 123 and 124 which are arranged to operate through the connecting links 113 and 114 to rotate the upper and lower switch blade assemblies 101 and 102 with a snap action from and to the switch closed position. The upper and lower manually operable handles 27 and 28 are secured to the upper and lower mechanism shafts 117 and 118 for rotating them. Driving pins 125 and 126 on the upper and lower manually operable handles 27 and 28 are arranged to engage the upper and lower spring levers 121 and 122 for compressing the overcenter springs 123 and 124 to a position slightly past a center position after which they discharge the energy stored therein for rotating the switch blade assemblies 101 and 102, respectively, to the next position.

Insulators 127, mounted on a transverse channel 128 secured to the rear wall 14 of the metallic housing 10, are arranged to carry the load contacts 64 for engagement by the fuses 63 when the fuse drawer 25 is moved to the closed position.

FIGS. 9, 10 and 11 show in greater detail the construction of the upper operating mechanism 59 while FIGS. 12, 13 and 14 are applicable in a similar manner for the lower operating mechanism 60.

FIG. 15 shows the upper and lower manually operable handles 27 and 28 in their positions corresponding to the switch open positions. In each of these positions it is desirable that the toggle linkages formed by the upper and lower operating arms 111 and 112 with the associated connecting links 113 and 114 be biased to the positions here shown which are slightly past the respective center position. Also it is desirable to absorb some of the shock incident to movement of these linkages and the associated parts to the switch open positions. Accordingly, as here shown, toggle control shock absorbing springs 131 and 132 are employed and they are arranged to engage the upper and lower switch blade operating arms 111 and 112, respectively. Suitable interphase insulating barriers (not shown) are positioned between the adjacent upper and lower feeder contacts 55 and 56, the associated upper and lower switch blade assemblies 101 and 102 and the common connections 62.

FIGS. 16, 17, 17A, 18 and 19 show the details of construction of the fuse drawer 25. The fuse drawer 25 comprises a front wall 135 and rearwardly extending left and right channel shaped side members 136 and 137. Upper and lower rollers 138 and 139 are mounted on the inner sides of the side members 136 and 137 near the back ends for cooperation with left and right tracks 140 and 141 in the form of angle members which are mounted in the metallic housing 10 between the front and rear walls 13 and 14 thereof. The forward ends of the tracks 140 and 141 are downwardly inclined as indicated at 142 in FIG. 17A for track 140 for the purpose of allowing the fuse drawer 25 to tilt downwardly slightly in the open position as here shown and prevent its being moved solely by gravity back to the drawer closed position. In the full open position and tilted slightly downwardly, some effort is required on the part of the operator to move the fuse drawer 25 inwardly. This provides a safety feature and tends to prevent the inadvertent closure of the fuse drawer 25. Drawer stops (not shown) are arranged in the metallic housing 10 to limit the movement of the fuse drawer 25 in the opening direction.

The fuses 63, of which three are provided for a three-phase installation, are mounted on a fuse holder 145 in the form of an insulating member which extends between the channel shaped side members 136 and 137 intermediate their ends and is secured thereto by screws 146. Each of the fuses 63 is formed with an insulating cylindrical fuse housing 147, as is conventional, and is provided with cylindrical terminals 148 and 149 at its ends. The fuses 63 can be of the current-limiting type or of the solid material type as many be desired. It will be recalled that load contacts 64, FIGS. 8A–8B, are arranged to be engaged by the fuses 63. The end terminals 148 are arranged to have this engagement and thereby to complete the circuit to the load conductors 65. The other cylindrical terminals 149 have the common connections 62 connected thereto. As seen in FIGS. 8A, 8B, 16 and 19 (sheet 8) the common connection 62 for each of the fuses 63 comprises a pair of blade members 150 of good conducting metal. They are provided with semi-circular portions 151 which extend around the respective cylindrical terminal 149 and are clamped thereto by bolts 152. Inturned split end contact portion 153, FIG. 16, are arranged to engage the upper and lower metallic switch blade support plates 103 and 104 as shown in FIGS. 8A–8B. As the fuse drawer 25 is moved inwardly to the closed position, the cylindrical terminals 148 on the inner ends of the fuses 63 engage the respective load contacts 64. At the same time the inturned split end contact portions 153 at the other ends of the fuses 63 engage the upper and lower metallic switch blade support plates 103 and 104 to complete the circuits thereto.

The fuse holder 145, which is formed of suitable insulating material, is provided with semi-circular grooves 155, FIG. 19, for receiving the fuses 63 with the fuse housings 147 thereof located centrally therein. It is desirable that the fuses 63 be accurately positioned on the fuse holder 145 in order to align the inturned split end contact portions 153 with the upper and lower metallic switch blade support plates 103 and 104. For this purpose fuse and clamp centering means, shown generally at 156 in FIG. 19, are employed for each fuse 63. This means includes a circular clamp 157 of insulation which is radially split at 158 to permit ready application to the insulating cylindrical fuse housing 147 of the respective fuse 63. A clamp bolt 159, also formed of insulation, is arranged to secure the circular insulating clamp 157 to the respective fuse 63. Formed integrally with the circular insulator clamp 157 is a T-shaped handle 160 which is employed not only for placing the respective fuse 63 in its semi-circular groove 155 but also for rotating it into or out of a predetermined position that locates the respective blade members 150 of the common connection 62 in alignment with the upper and lower metallic switch blade support plates 103 and 104. An intermediate groove 161, deeper than groove 155, is arranged to receive the clamp 157.

In order to position accurately the respective fuse 63 in its groove 155 in the fuse holder 145 a shoulder 162 is formed in the respective intermediate groove 161 and it is arranged to be engaged by a detent 163 that is formed integrally on the circular insulating clamp 157. When the detent 163 is in engagement with the respective shoulder 162, the arrangement is such that the pair of blade members 150 forming the respective common connections 62 are properly aligned with the respective upper and lower metallic switch blade support blades 103 and 104. Each of the circular insulating clamps 157 has a shoulder 164 extending laterally therefrom for engagement by a latch 165 of suitable insulating material that is mounted on the fuse holder 145 by a bolt 166 that also is formed of insulation. An insulating resilient bushing 167 is interposed between the head of the bolt 166 and the latch 165 for urging the latter into latching engagement with the shoulder 164 on the circular insulating clamp 157. This construction and arrangement of the fuse clamp and centering means 156 for each of the fuses 63 employs no metallic parts between the terminals 148 and 149 and thus maintains the insulation integrity therebeen insofar as the external mounting of the fuses 63 is concerned. Since the clamp 157 and T-shaped handle 160 are formed of insulating material, removal of a blown fuse 63 is facilitated. Because of the heat that is generated on blowing of a fuse, particularly a current-limiting fuse, the fuse housing 147 may be raised to a relatively high temperature and thus may be too hot to be grasped manually. The handle 160 of insulation is likely to remain relatively cool and can be manipulated manually under these circumstances.

After a fuse 63 has blown, the blade members 150, which form the common connection 62, are removed together with the clamp 157. They are reusable and can be applied to an unblown fuse which then is mounted in centered and latched position on the fuse holder 145.

The fuse drawer 25 is held in the closed position in the metallic housing 10 by locking plates 170 and 171, FIG. 18, (sheet 6) which are mounted on the inside of the front wall 135 and are arranged to move endwise with a slight rotary motion. For this purpose slots 172 and 173 are formed in the locking plates 170 and 171 through which guide and support pins 174 and 175 project from the inside of the front wall 135. At their inner ends the locking plates 170 and 171 are pivotally connected by pivot pins 176 and 177 to the ends of a lever 178, FIG. 16, which is secured to a shaft 179 that is rotatably mounted in the front wall 135 and extends therethrough to receive at its outer end the fuse drawer latch operating handle 26. Positioning springs 180 and 181, FIG. 18, are secured at 182 and 183 to the inside of the front wall 135 and their distal ends are arranged to cooperate with the pivot pins 176 and 177 to hold them in either operative position depending upon the rotation of the operating handle 26. In FIG. 18 the positioning springs 180 and 181 are shown as holding the locking plates 170 and 171 in the position in which they lock the fuse drawer 25 in the metallic housing 10.

The locking plates 170 and 171 have bifuracted end portions 184 and 185 which, as shown in FIG. 18, are arranged to straddle the channel shaped side members 136 and 137. The bifurcated end portions 184 and 185 are arranged to be moved into locking engagement with left and right vertical flanges, one of which is shown at 186 in FIGS. 8A–8B, of the metallic housing 10 in the drawer locked position. In order to open the fuse drawer 25, the bifurcated end portions 184 and 185 must be withdrawn from overlapping engagement with these vertical flanges one indicated at 186. This is accomplished by rotating the latch operating handle 26 in such direction as to move the locking plates 170 and 171 endwise toward each other. Provision is made, as will be apparent presently, for preventing movement of the locking plates 170 and 171 to their unlocked positions to permit the opening of the fuse drawer 25 only when the upper and lower feeder switch blades 57 and 58 are in the open position. Also provision is made for preventing operation of the upper and lower operating mechanisms 59 and 60 by movement of the upper and lower manually operable handles 27 and 28 when the fuse drawer 25 is in the open position. For these purposes upper and lower detents 188 and 189, FIG. 18 (sheet 6), on the locking plate 170 cooperate with interlocking means to be described for the switch blades 57 and 58. The locking plate 171 is provided with upper and lower detents 190 and 191 which cooperate with interlocking means to be described for preventing operation of the upper and lower operating mechanisms 59 and 60, when the fuse drawer 25 is open.

It is desirable that provision be made for adequate insulation between the terminals 149 of the fuses 63, and also betwen them and the side members 136 and 137 of the fuse drawer 25 and the left and right side walls 11 and 12 of the metallic housing 10. For this purpose, as shown in FIG. 16, vertical insulating barriers 192 are employed. Four barriers 192 are provided, the two intermediate barriers being located on opposite sides of the intermediate fuse 63 while the other two barriers are positioned between the outer fuses 63 and the drawer side members 136 and 137. A pair of horizontal insulating barriers 193, FIG. 19 (sheet 8), is provided in overlying relation to the vertical insulating barriers 192 and adjacent the inside of the front wall 135 to limit access to the interior of the fuse drawer 25 when it has been partly opened. The horizontal insulating barriers 193 are secured to the vertical insulating barriers 192 and the outermost pair of these barriers is spaced by insulating blocks 194 and 195 from the adjacent side members 136 and 137 and are secured thereto by suitable insulating bolts 196.

As pointed out above, provision is made for interlocking the fuse drawer 25 with the upper and lower feeder switch blades 57 and 58 in such manner that the fuse drawer 25 can be opened only when both sets of switch blades 57 and 58 are in the open position. For this purpose upper and lower interlocking means 197 and 198, FIGS. 8A–8B, are employed between the fuse drawer 25 and the upper and lower switch blade assemblies 101 and 102. The interlocking means 197 and 198 include, respectively, upper and lower locking levers 199 and 200 that are secured to and rotate with the respective switch blades 57 and 58. Laterally extending pins 201 and 202 on the locking levers 199 and 200 extend into slots 203 and 204 that are located in upper and lower locking plates 205 and 206 that are pivotally mounted at 207 and 208 in the metallic housing 10 adjacent the side wall 11. The distal ends 209 and 210 of the locking plates 205 and 206 are arranged to cooperate with the upper and lower detents 188 and 189, respectively, on the locking plate 170. Upper locking plate 205 is shown in locking engagement with the upper detent 188. This corresponds to the closed position of the switch blades 57 or the closed position of the upper switch blade assembly 101. In FIG. 8B the lower locking plate 206 is shown out of locking engagement with the lower detent 189. This corresponds to the open position of the lower feeder switch blades 58 or the open position of the lower switch blade assembly 102. It is only when both sets of switch blades 57 and 58 occupy the open position that both of the locking plates 205 and 206 are moved out of locking engagement with the detents 188 and 189 and the locking plate 170 can be moved to the unlocked position to permit the drawer 25 to be opened. Upper and lower stop flanges 211 and 212 are stationarily mounted on the vertical flange 186 to reinforce the locking plates 205 and 206 and prevent bending thereof in the locked positions when an attempt is made to rotate the latch operating handle 26 and move the locking plate 170 to the unlocked position when the locking plates 205 and 206 occupy the locked positions.

Referring now to FIGS. 20, 21 and 22 of the drawings, it will be noted that provision is made for preventing movement of the upper manually operable handle 27, secured to upper mechanism shaft 117, from the lowermost position, corresponding to the open position of the upper feeder switch blades 57 when the fuse drawer 25 is in the open position in which the locking plate 171 has been operated by the fuse drawer latch operating handle 26 to the alternate inward position which permits opening of the fuse drawer 25. For this purpose interlocking means indicated, generally, at 215 is employed. The interlocking means 215 is interposed between the upper operating mechanism 59, FIG. 8A, which includes the upper manually operable handle 27 secured to upper mechanism shaft 117, and the fuse drawer 25 or more specifically the upper detent 190 on the locking plate 171. A similar interlocking means is provided between the lower operating mechanism 60, FIG. 8B, which includes the lower manually operable handle 28, and the lower detent 191 which also is carried by the locking plate 171. Since these interlocking means are essentially duplicates of each other, only the interlocking means 215 is shown and described herein. However, it will be understood that, when the fuse drawer 25 is moved away from the closed position after operation of the latch operating handle 26 to permit it to be withdrawn, it is not possible to rotate either the upper or lower manually operable handle 27 or 28 from the lowermost positions thereof which correspond to the open positions of the upper and lower feeder switch blades 57 and 58.

The interlocking means 215 includes a locking cam 216, FIG. 11 that is secured to the upper mechanism shaft 117 for conjoint rotation therewith and with the upper manually operable handle 27. Positioning shoulders 217 and 218, FIG. 20, are provided on the periphery of the cam 216 for cooperation with a cam follower 219 that is pivotally mounted at 219' on the inside wall of the housing for mechanism 59 and is biased by a torsion spring 220. The cam follower 219 is held by the spring 220 in engagement with one or the other of the positioning shoulders 217 or 218 to hold the mechanism shaft 117 and thereby the manually operable handle 27 against rotation from either its upper position or its lower position until the biasing action of the torsion spring 200 is overcome by the application of sufficient force manually to the operating handle 27. In FIG. 20 the locking cam 216 is shown in the position that it occupies when the handle 27 is in the lowermost switch open position corresponding to the open position of the upper feeder switch blades 57.

The locking cam 216 has an arcuate peripheral portion 221 that is arranged to overlie a lug 222 on a locking member 223 when the locking cam 216 is rotated to a position corresponding to the open position of the feeder switch blades 57. This action prevents upward movement of the locking member 223 after the locking cam 216 is rotated with the handle 27 to the uppermost position corresponding to the closed position of the feeder switch blades 57 and, as will appear hereinafter, prevents opening of the fuse drawer 25. The locking member 223 is mounted for generally endwise movement with a slight degree of rotation and carries the lug 222 which is arranged to enter a radial slot 224 in the locking cam 216 to prevent rotation thereof when the fuse drawer 25 is opened. At its upper end the locking member 223 has an elongated slot 225 which is guided on the mechanism shaft 117. The lower end 226 of the locking member 223 extends at right angles to the upper portion and is pivotally connected at 227, FIG. 21, to a locking cam 228 which is pivotally mounted at 299 in the metallic housing 10. A torsion spring 230 acts to bias the locking cam 228 in a clockwise direction as viewed in FIG. 21 and to move the locking member 223 upwardly to cause the lug 222 to enter the radial slot 224 under certain conditions. The locking cam 228 is provided with a slot 231 that is arranged to receive the upper detent 190 on the locking plate 171 when the fuse drawer 25 is in the closed position.

Now it will be apparent that the fuse drawer latch operating handle 26 can be rotated to move the locking plates 170 and 171 from the locked position shown in FIG. 18 to permit the opening of the fuse drawer 25 only when the locking cam 216 occupies the position shown in FIG. 20 corresponding to the lowermost position of the upper manually operable handle 27 and the open position of the upper feeder switch blades 57. Assuming that the locking plate 170 is free to move inwardly on rotation of the fuse drawer latch operating handle 26, the locking plate 171 also can be moved inwardly since the upper detent 190 is permitted to move inwardly accompanied by rotation of the locking cam 228 and upward movement of the locking member 223 with the lug 222 thereon entering the radial slot 224 in the locking cam 216. When detent 190 is disengaged, the torsion spring 230 then holds the locking member 223 in the elevated position and the lug 222 prevents rotation of the locking cam 216 and thereby of the mechanism shaft 117 on application of force to the upper manually operable handle 27.

In a similar manner the lower handle 28 is held in its lowermost switch open position and is prevented from being rotated as long as the fuse drawer 25 remains in the open position and until the fuse drawer 25 has been returned to the fully closed position followed by rotation of the latch operating handle 26 to the horizontal position in which the locking plates 170 and 171 are moved outwardly into locking engagement with the left and right vertical flanges of the metallic housing 10 one shown at 186 in FIGS. 8A–8B.

It will be noted that, with the fuse drawer 25 in the fully closed and latched position, rotation of the locking cam 216 from its position shown in FIG. 20 toward the switch closed position, causes the arcuate peripheral portion 221 to overlie the lug 222. Then it is not possible to rotate the fuse drawer latch operating handle 26 from the horizontal position. When the upper manually operable handle 27 is in the lowermost position, corresponding to the open position of the feeder switch blades 57 or of the upper switch blade assembly 101, the radial slot 224 in the locking cam 216 is in a position to receive the lug 222. On inward movement of the locking plate 171, the upper detent 190 in the slot 231 moves inwardly and allows the torsion spring 230 to rotate the locking cam 228 inwardly accompanied by upward movement of the locking member 223. This is permitted by the slot 225 in which one end of the mechanism shaft 117 is located. The upward movement continues until the lug 222 seats at the bottom of the radial slot 224 in which position it prevents rotation of the locking cam 216 and thereby of the upper manually operable handle 27. The torsion spring 230 holds the locking member 223 in the uppermost position as long as the fuse drawer 25 is open. After the fuse drawer 25 is closed and the latch operating handle 26 is rotated to move the locking plate 171 outwardly to locking position, the upper detent 190 enters the lower end of the slot 231 in the locking cam 228 and continued outward movement of the locking plate 171 carries with it the upper detent 190 and rotates the locking cam 228 against the biasing action of the torsion spring 230 which is accompanied by downward movement of the locking member 223 and withdrawal of the lug 222 from the radial slot 224.

As pointed out above interlocking means, similar to the interlocking means 215, is provided between the fuse drawer 25 and the lower operating mechanism 60 which requires that the lower manually operable handle 28 be in the lowermost position before the locking plate 171 can be moved from the drawer locked position. Such interlocking means is applied to the left end of the mechanism shaft 118, FIG. 14, and it operates in the manner described above for the interlocking means 215.

When it becomes necessary to service the mechanism within the metallic housing 10, particularly the upper and lower feeder contacts 55 and 56, it is desirable for reasons of safety that provision be made for connecting them to ground. Accordingly, as shown in FIGS. 8A–8B the upper and lower feeder contacts 55 and 56 are provided with upper and lower ground contacts 235 and 236 that are arranged to be engaged, respectively, by ground switch blades 237 and 238. Where a three-phase installation is involved, three upper and three lower ground switch blades 237 and 238 are employed and they are mounted for conjoint rotation on upper and lower ground switch shafts 239 and 240 that are suitably journaled in the metallic housing 10 adjacent its rear wall 14. It will be understood that the cover and ground switch locking plates 18, FIG. 1, are arranged to overlie hexagonal upper and lower ends 241 and 242 of the upper and lower ground switch shafts 239 and 240 and that these plates 18 must be removed, using special tools, before access can be had to the hexagonal ends 241 and 242 for rotating the ground switch shafts 239 and 240 to swing the ground switch blades 237 and 238 into contact engagement with the upper and lower ground contacts 235 and 236.

The ground switch blades 237 and 238 can be operated to their switch closed positions only when the upper and lower switch blades 57 and 58 are in the open positions. Also, when either of the ground switch blades 237 or 238 is in the closed position, provision is made for preventing movement of the respective upper and lower feeder switch blades 57 and 58 into their closed positions. For these purposes interlocking means 243 and 244 are employed between the upper and lower ground switch blades 237 and 238, or the upper and lower shafts 239 and 240 on which they are mounted for conjoint rotation, and the upper and lower feeder switch blades 57 and 58 or the upper and lower switch blade assemblies 101 and 102. The upper and lower interlocking means 243 and 244 comprise upper and lower locking cams 245 and 246 that are secured to the upper and lower ground switch shafts 239 and 240 for rotation therewith. Upper and lower arms 247 and 248 extend from the locking cams 245 and 246 and they are provided, respectively, with upper and lower arcuate slots 249 and 250. The upper and lower arms 247 and 248 and the upper and lower arcuate slots 249 and 250 are arranged to cooperate with upper and lower pins 251 and 252 which are carried at the ends of upper and lower locking arms or links 253 and 254 and project through longitudinally extending slots 255 and 256 in upper and lower channel shaped brackets 257 and 258 which are suitably secured to and extend from the rear wall 14 to the left side wall 11. The other ends of the locking arms or links 253 and 254 are pivotally connected at 259 and 260 to the upper and lower locking levers 199 and 200 which, it will be recalled, are secured to and rotate with the switch blades 57 and 58 and with the switch blade assemblies 101 and 102. In FIG. 8A the upper ground switch blades 237 are illustrated as being in the open position with the upper arm 247 overlying the upper pin 251 at the right end of the upper locking arm or link 253. Since the upper feeder switch blades 57 are shown in the closed position, the upper interlocking means 243, in the manner described, prevents rotation of the upper ground switch shaft 239 and movement of the upper ground switch blades 237 into engagement with the upper ground contacts 235 on the upper feeder contact 55.

In FIG. 8B, since the lower feeder switch blades 58 are shown in the open position, the lower pin 252 at the right end of the lower locking arm or link 254 is positioned at the right end of the slot 256 and in registry with the lower arcuate slot 250 in the lower locking cam 246. A suitable wrench can be applied to the lower hexagonal end 242 of the lower ground switch shaft 240 for rotating the lower ground switch blades 238 into engagement with the lower ground contacts 236 on the lower feeder contact 56.

Prior to closure of either the upper or the lower ground switch blades 237 or 238, suitable steps must be taken to insure that the circuits feeding the upper and lower feeder conductors 53 and 54 are de-energized since no provision is made within the metallic housing 10 for detecting whether or not the conductors 53 and 54 are energized or de-energized.

In FIGS. 23–27 of the drawings certain details of construction of the embodiment of the invention illustrated in FIGS. 6 and 7 are shown. The metallic housing 36 is similar in construction to the metallic housing 10. It is somewhat narrower and shorter since it is intended for use in connection with a single-phase primary selector system for one or two fuses. Where possible the same reference characters are employed where the same elements are used as referred to hereinbefore in connection with the embodiment of the invention shown in FIGS. 8 to 22.

Referring now particularly to FIG. 23, it will be noted that an insulator 264 is provided for supporting the load contact 78 to be engaged by terminal 148 of the fuse 77. An additional insulator 264 is also provided for supporting another load contact, similar to load contact 78, for engagement by one terminal of another fuse 77, if it is used. The insulators 264 are mounted on a transverse channel 265 that is carried by the rear wall 40 of the metallic housing 36. It will be understood that the load conductors 79 are connected to the load contacts 78 carried by the insulators 264.

The fuse drawer 46 is similar in construction to the construction of the fuse drawer 25, except that it is narrower. Between the channel shaped side members 136 and 137 of the drawer 46 there is secured a fuse holder 266 which corresponds in construction to the fuse holder 145 except that it is shorter since provision is made for mounting only two fuses 77. The fuse 77 is identical in construction to the fuse 63 previously described and it has the cylindrical terminal 148 at one end for engaging the load contact 78, as noted, and a cylindrical terminal 149 at the other end for engaging a connection that is similar to the common connection 62 but employing only the upper portions of the pair of blade members 150, FIG. 19 (sheet 8), with the semi-circular portions secured to the cylindrical terminal 149. When a second fuse 77 is mounted on the transverse fuse holder 266, a similar connection is provided for its end terminal 149. The previously described fuse clamp and centering means 156 are employed for securing the fuses 77 in proper position on the fuse holder 266.

The switch blades 72 and 73 form parts of left and right switch blade assemblies that are indicated, generally, at 268 and 269. The switch blades 72 and 73 are secured to left and right metallic switch blade support plates 270 and 271 that are similar to the metallic switch blade support plates 103 and 104. It will be understood that the metallic switch blade support plates 270 and 271 are arranged to have contact engagement with the connections which are mounted on the end terminals 149 of the fuses 77.

The switch blade assemblies 268 and 269 are mounted, respectively, on insulators 272 and 273 from which stub shafts 274 and 275 project in opposite directions. The stub shafts 274 and 275 are suitably journaled on the side walls 37 and 38 of the metallic housing 36.

The switch blade assemblies 268 and 269 are interconnected by the common connection 76 to permit transfer of the load circuits from one to the other of the switch blades 72 or 73 or to provide for parallel operation from the two associated feeder circuits as may be desired. Since the feeder contacts 70 and 71, FIG. 6, are identical in construction to the feeder contacts 55, previously described, they are not here shown in detail.

FIG. 27 shows the details of construction of the common connection 76 between the switch blade assemblies 268 and 269. The insulators 272 and 273 have secured thereto metallic insulator caps 278 and 279 which carry contact fittings 280 and 281 with the metallic switch blade support plates 270 and 271 clamped therebetween for rotation therewith. The contact fitting 280 includes a cylindrical contact section 282 which extends laterally therefrom while the contact fitting 281 has formed integrally therewith an internally threaded cylindrical section 283 into which one end of a contact sleeve 284 is threaded at 285. The other end of the contact sleeve 284 is longitudinally slotted at 286 and is arranged to telescope over the cylindrical contact section 282. A groove 287 is formed around the slotted end 286 of the contact sleeve 284 for receiving a garter spring 288 that is employed to bias the slotted end 286 into good contact engagement with the cylindrical contact section 282 on the contact fitting 280.

It is desirable that provision be made for mechanically supporting the inner ends of the rotatable insulators 272 and 273. For this purpose a switch blade support shaft 291 is threaded at 292 into the cylindrical contact section 282 and it extends in telescopic relation within the contact sleeve 284 and into the cylindrical section 283 on the contact fitting 281. Bearing sleeves 293 of suitable plastic material are carried by the switch blade support shaft 291 and serve to journal the contact sleeve 294 thereon, thus providing the desired bearing support for the inner ends of the rotatable insulators 272 and 273 and parts mounted thereon.

As pointed out the metallic housing 36, FIG. 23, is somewhat narrower than the metallic housing 10. Accordingly, the fuse drawer 46 is correspondingly narrower. The fuse drawer 46 includes a front wall 295 which is similar in construction to the front wall 135 of the fuse drawer 25 but it is somewhat shorter. The front wall 295 has the channel shaped side members 136 and 137 extending therefrom and provided with rollers (not shown here) for mounting on the tracks 140 and 141 which extend inwardly from the rear wall 40 of the metallic housing 36 and are suitably supported at their forward ends 142 and 143 which are inclined downwardly for the reason previously outlined.

On inner side of the front wall 295 of the fuse drawer 46 locking plates 296 and 297 are mounted in the manner that the locking plates 170 and 171 are mounted on the rear of the front wall 135 of the fuse drawer 25. The locking plates 296 and 297 are arranged to be operated by the fuse drawer latch operating handle 47 in a manner similar to the operation of the locking plates 170 and 171 by the handle 26. End portions 298 and 299 of the locking plates 296 and 297 are arranged to be moved past left and right vertical flanges 300 and 301 of the metallic housing 36 to prevent withdrawal of the fuse drawer 46. The end portions 298 and 299 have inturned left and right detents 302 and 303 that are arranged to cooperate with interlocking means, such as the interlocking means 215, previously described, for use with the left and right operating mechanisms 74 and 75 in the manner previously described in order to prevent unlocking of the drawer 46 for movement to the open position when either of the switch blade assemblies 268 or 269 is in the closed position with the respective operating mechanism 74 and 75 in the corresponding position.

FIGS. 24, 25 and 26 show the details of construction of the operating mechanism 74 which corresponds in construction to the construction of the right operating mechanism 75 that, in turn, is identical with the construction of the upper operating mechanism 94, FIGS. 9, 10 and 11, previously described. The important difference in construction of mechanism 74 is that the arrangement is such that the mechanism shaft 117 extends from left to right rather than from right to left and corresponding other changes are made in the mounting and arrangement of the parts to accommodate the left mounting of the mechanism 74 as will be understood. Interlocking means, such as the interlocking means 215, are mounted on the right end of the mechanism shaft 117, FIG. 26, for operation in conjunction with the detent 302.

It will be understood that interlocking means, such as the previously described interlocking means 197 or 198, can be provided between the switch blade assemblies 268 and 269 and the locking plates 296 and 297 to prevent opening of the fuse drawer 46 unless the switch blades 72 and 73 both are in the open positions. Also ground switch blades, such as the ground switch blades 237 or 238 described above, can be arranged to cooperate with the switch blade assemblies 268 and 269 for grounding the feeder contacts 70 and 71 in the manner set forth to the end that neither of the feeder contacts 70 or 71 can be grounded when either of the switch blades 72 or 73 is closed and neither of these switch blades can be closed when one or the other of the feeder contacts 70 or 71 is grounded.

Additional insulating barriers, complementary to the insulating barriers 192, FIG. 16, can be stationarily mounted between the transverse channels 87 and 88, FIGS. 8A–8B, to furnish insulation between the adjacent upper and lower feeder contacts 55 and 56 and the conducting parts, including the fuse terminals 148, energized therewith.

What is claimed as new is:

1. Switchgear comprising
a metallic housing,
a load contact insulatingly mounted in said housing,
a drawer mounted for movement horizontally of said housing,
a fuse carried by said drawer and having terminals at its ends, one of said terminals being engageable with and disengageable from said load contact on movement of said drawer into and out of said housing respectively,
a feeder contact insulatingly mounted in said housing in vertical spaced relation to said drawer,
a feeder switch blade insulatingly rotatably mounted in said housing in vertical spaced relation to said drawer and connected at one end to the other terminal of said fuse when said drawer is closed and movable into and out of engagement with said feeder contact,
an operating mechanism in said housing connected to said feeder switch blade, and
interlocking means in said housing cooperating with said feeder switch blade and said drawer to prevent opening of said drawer when said feeder switch blade is in closed position.

2. The switchgear according to claim 1 wherein said interlocking means includes
a locking lever secured to and rotatable conjointly with said feeder switch blade,
a first locking plate rotatably mounted in said housing and connected to said locking lever for rotation thereby to unlocked position when said said feeder switch blade is in open position and to locked position when said feeder switch blade is in closed position, and
a second locking plate movably mounted on said drawer and cooperating with said housing to hold said drawer in closed position and carrying a detent in overlying relation to the distal end of said first locking plate when said feeder switch blade is in closed position to prevent movement of said second locking plate to drawer unlocking position, and
a handle on said drawer connected to said second locking plate for moving it between drawer locked and unlocked positions.

3. The switchgear according to claim 1 wherein
said operating mechanism for said feeder switch blade includes a shaft that is rotated to one position to close said feeder switch blade and is rotated to another position to open said feeder switch blade,
said interlocking means includes
a first locking cam secured to said shaft and having a slot extending radially from its periphery,
a locking member movably mounted on said shaft and carrying a lug for entering said slot to prevent rotation of said shaft from said other position when said drawer is open and to engage the periphery thereof when said shaft is rotated to said one position to prevent opening said drawer,
a second locking cam rotatably mounted in said housing, connected to said locking member, and biased to urge said locking member and thereby said lug toward said first locking cam, and
a locking plate movably mounted on said drawer, cooperating with said housing to hold said drawer in close position, and carrying a detent for engaging said second locking cam when said drawer is closed to hold said lug out of said slot, and
a handle on said drawer connected to said locking plate for moving it between drawer locked and unlocked positions.

4. The switchgear according to claim 2 wherein
said operating mechanism for said feeder switch blade includes a shaft that is rotated to one position to close said feeder switch blade and is rotated to another position to open said feeder switch blade, said interlocking means includes a first locking cam secured to said shaft and having a slot extending radially from its periphery, a locking member movably mounted on said shaft and carrying a lug for entering said slot to prevent rotation of said shaft from said other position when said drawer is open and to engage the periphery thereof when said shaft is rotated to said one position to prevent opening said drawer, a second locking cam rotatably mounted in said housing, connected to said locking member, and biased to urge said locking member and thereby said lug toward said first locking cam, and a third locking plate movably mounted on said drawer cooperating with said housing to hold said drawer in closed position, and carrying a detent for engaging said second locking cam when said drawer is closed to hold said lug out of said slot, and means interconnecting said handle and said third locking plate for moving it conjointly with said second locking plate.

5. The switchgear according to claim 1 wherein ground switch means is provided in said housing for engaging said feeder contact, and interlocking means in said housing interconnecting said ground switch means and said feeder switch blade prevent closing said ground switch means when said feeder switch blade is in closed position and closing of said feeder switch blade when said ground switch means engages said feeder contact.

6. The switchgear according to claim 5 wherein said ground switch means includes a rotatably mounted ground switch blade, and said interlocking means between said ground switch means and said feeder switch blade includes a locking lever secured to and rotatable conjointly with said feeder switch blade, a ground switch locking cam secured to and rotatable conjointly with said ground switch blade, and a locking arm operatively interconnecting said locking lever and said ground switch locking cam.

7. Switchgear according to claim 1 wherein a second feeder contact is insulatingly mounted in said housing and said feeder contacts are located respectively above and below said drawer, a second feeder switch blade is insulatingly rotatably mounted in said housing and is connected at one end to said other terminal of said fuse when said drawer is closed and is movable into and out of engagement with said second feeder contact, said feeder switch blades being located respectively above and below said drawer, an operating mechanism is provided in said housing and connected to said second feeder switch blade, and additional interlocking means in said housing cooperate with said second feeder switch blade and said drawer to prevent opening of said drawer when said second feeder switch blade is in closed position.

8. The switchgear according to claim 7 wherein each interlocking means includes a locking lever secured to and rotatable conjointly with each feeder switch blade, and a first locking plate rotatably mounted in said housing for each locking lever and connected thereto for rotation thereby to unlocked position when the respective feeder switch blade is in open position and to locked position when the respective feeder switch blade is in closed position, a second locking plate movably mounted on said drawer and cooperating with said housing to hold said drawer in closed position and carrying a pair of detents each individual to one of said first locking plates and positioned in overying relation to the respective distal ends thereof when the respective feeder switch blade is in closed position to prevent movement of said second locking plate to drawer unlocking position, and a handle on said drawer connected to said second locking plate for moving it between drawer locked and unlocked positions.

9. The switchgear according to claim 7 wherein said operating mechanisms for said feeder switch blades each include a shaft that is rotated to one position to close the respective feeder switch and is rotated to another position to open the respective feeder switch includes a first locking cam secured to the respective mechanism shaft and having a slot extending radially from its periphery, a locking member movably mounted on the respective shaft and carrying a lug for entering said slot to prevent rotation of said shaft from said other position when said drawer is open and to engage the periphery thereof when said shaft is rotated to said one position to prevent opening said drawer, and a second locking cam rotatably mounted in said housing, connected to said locking member, and biased to urge said locking member and thereby said lug toward said first locking cam, a locking plate movably mounted on said drawer, cooperating with said housing to hold said drawer in closed position and carrying a pair of detents for engaging respectively said second locking cam of each interlocking means when said drawer is closed to hold the respective lug out of the respective slot, and a handle on said drawer connected to said locking plate for moving it between drawer locked and unlocked positions.

10. The switchgear according to claim 8 wherein said operating mechanisms for said feeder switch blades each include a shaft that is rotated to one position to close the respective feeder switch and is rotated to another position to open the respective feeder switch, each interlocking means includes a first locking cam secured to the respective mechanism shaft and having a slot extending radially from its periphery, a locking member movably mounted on the respective shaft and carrying a lug for entering said slot to prevent rotation of said shaft from said other position when said drawer is open and to engage the periphery thereof when said shaft is rotated to said one position to prevent opening said drawer, and a second locking cam rotatably mounted in said housing, connected to said locking member, and biased to urge said locking member and thereby said lug toward said first locking cam, a third locking plate movably mounted on said drawer, cooperating with said housing to hold said drawer in closed position, and carrying a pair of detents for engaging respectively said second locking cam of each interlocking means when said drawer is closed to hold the respective lug out of the respective slot, and means interconnecting said handle and said third locking plate for moving it conjointly with said second locking plate.

11. The switchgear according to claim 1 wherein said feeder switch blade is arranged to carry current between said feeder contact and said fuse and to interrupt said current and to close on said current, and current interrupter means mounted on said feeder contact cooperate with said feeder switch blade to extinguish the arc incident to movement of said feeder switch blade to open position.

12. The switchgear according to claim 11 wherein said operating mechanism includes over center spring means for rotating said feeder switch blade with a snap action to open or closed position depending upon the last position to which it has been operated.

13. The switchgear according to claim 1 wherein said drawer includes a front wall member with a pair of side members extending therefrom into said metallic housing, a fuse holder of insulating material secured to and extending between said side members, and 14. The switchgear according to claim 13 wherein said interlocking means includes a pair of locking plates movably mounted on the inside of said front wall member to extend beyond the ends thereof into locking engagement with said metallic housing, and a handle rotatably mounted on said front wall, extending outwardly therefrom and connected to said locking plates for moving them conjointly to and from locking position.

15. Switchgear according to claim 1 wherein means is provided for use with a polyphase circuit and includes for each additional phase arranged as aforesaid a load contact, a fuse, a feeder switch blade, and insulating barrier means between the respective phases, and said operating mechanism is connected to said switch blades to rotate them conjointly.

clamp and centering means on said fuse holder for detachably securing said fuse thereon in predetermined position, track means in said metallic housing support said side members for movement of said drawer into and out of said housing, said feeder switch blade is connected to said other fuse terminal by contact means secured thereto and having detachable contact engagement with said switch blade.

16. Switchgear according to claim 7 wherein means is provided for use with polyphase circuit and includes for each additional phase arranged as aforesaid a load contact, a fuse, upper and lower feeder contacts, and upper and lower feeder switch blades, insulating barrier means between the respective phases, and said operating mechanisms are connected to said upper and lower feeder switch blades to rotate them conjointly.

17. The switchgear according to claim 1 wherein insulating barrier means carried by said drawer overlie said other terminal of said fuse to prevent contact with said other terminal until said drawer is opened to a predetermined position.

18. The switchgear according to claim 1 wherein a fuse holder of insulating material extends transversely of said drawer intermediate its ends and is movable therewith to move said one terminal of said fuse into and out of engagement with said load contact, and clamp and centering means on said fuse and said fuse holder detachably secure said fuse in a predetermined position on said fuse holder.

19. The switchgear according to claim 18 wherein said clamp and centering means include an arcuate groove extending transversely of said fuse holder for receiving said fuse and having an intermediate groove therein provided with a shoulder, a circular clamp secured to said fuse, extending into said intermediate groove and having a detent for engaging said shoulder, and resilient latch means reacting between said fuse holder and said circular clamp to hold said detent against said shoulder.

20. The switchgear according to claim 7 wherein a fuse holder of insulating material extends transversely of said drawer intermediate its ends and is movable therewith to move said one terminal of said fuse into and out of engagement with said load contact, common connecting means secured to said other terminal of said fuse for connection to said feeder switch blades above and below said drawer when said drawer is in closed position, and clamp and centering means on said fuse and said fuse holder detachably secure said fuse in a predetermined position on said fuse holder.

21. The switchgear according to claim 20 wherein said clamp and centering means include an arcuate groove extending transversely of said fuse holder for receiving said fuse and having an intermediate groove therein provided with a shoulder, a circular clamp secured to said fuse, etxending into said intermediate groove and having a detent for engaging said shoulder to locate said common connecting means in operative relation to said feeder switch blades, and resilient latch means reacting between said fuse holder and said circular clamp to hold said detent against said shoulder.

22. Switchgear comprising a metallic housing, a load contact insulatingly mounted in said housing, a drawer mounted for movement horizontally of said housing, a fuse carried by said drawer and having terminals at its ends, one of said terminals being engageable with and disengageable from said load contact on movement of said drawer into and out of said housing respectively, a pair of feeder contacts insulatingly mounted in coplanar relation in said housing in vertical spaced relation to said drawer, a pair of feeder switch blades insulatingly independently coaxially rotatably mounted in said housing in vertical spaced relation to said drawer and having a common connection therebetween to the other terminal of said fuse when said drawer is closed and movable respectively into and out of contact engagement with said feeder contacts, an operating mechanism in said housing connected to each of said feeder switch blades for independently operating them, and interlocking means in said housing cooperating with each feeder switch blade and said drawer to prevent opening thereof when either feeder switch blade is in closed position.

23. The switchgear according to claim 22 wherein said interlocking means comprises interlocking mechanism connected between said drawer and each operating mechanism either of which interlocking mechanism prevents opening of said drawer when the respective operating mechanism occupies a position corresponding to the closed position of the respective feeder switch blade.

24. The switchgear according to claim 23 wherein each operating mechanism includes a shaft that is rotated to one position to close the respective feeder switch blade and is rotated to another position to open it, said interlocking means comprises interlocking mechanism operatively connected to said drawer and each operating mechanism includes a first locking cam secured to said shaft and having a slot extending radially from its periphery, a locking member slidably and rotatably mounted on said shaft and carrying a lug for entering said slot to prevent rotation of said shaft from said other position when said drawer is open and to engage the periphery thereof when said shaft is rotated to said one position to prevent opening said drawer, a second locking cam rotatably mounted in said housing, connected to said locking member, and biased to urge said locking member and thereby said lug toward said first locking cam, and a locking plate movably mounted on said drawer, cooperating with said housing to hold said drawer in closed position, and carrying a detent for engaging said second locking cam when said drawer is closed to hold said lug out of said slot, and a handle on said drawer connected to each locking plate for moving the same between the drawer locked and unlocked positions.

25. Switchgear according to claim 23 wherein the common connection between said switch blades includes a tubular contact member secured to one of said feeder switch blades and rotatable therewith about its axis of rotation, and a cylindrical contact stud secured to the other of said feeder switch blades, rotatable therewith about its axis of rotation, and telescoped with the distal end of said tubular contact member.

26. The switchgear according to claim 25 wherein a support shaft is secured to said other feeder switch blade, is rotatable therewith about its axis of rotation, and is telescoped with said tubular contact member to provide bearing support for said feeder switch blades.

27. The switchgear according to claim 22 wherein a fuse holder of insulating material extends transversely of said drawer intermediate its ends and is movable therewith to move said one terminal of said fuse into and out of engagement with said load contact, connecting means is secured to the other terminal of said fuse for connection to one of said feeder switch blades when said drawer is in closed position, and clamp and centering means on said fuse and said fuse holder detachably secure said fuse in a predetermined position on said fuse holder.

28. The switchgear according to claim 27 wherein said clamp and centering means include an arcuate groove extending transversely of said fuse holder for receiving said fuse and having an intermediate groove therein provided with a shoulder, a circular clamp secured to said fuse, extending into said intermediate groove and having a detent for engaging said shoulder to locate said common connecting means in operative relation to said feeder switch blades, and resilient latch means reacting between said fuse holder and said circular clamp to hold said detent against said shoulder.

29. The switchgear according to claim 22 wherein said interlocking means comprises interlocking mechanism connected between said drawer and each feeder switch blade either of which prevents opening of said drawer when it is in closed position.

30. The switchgear according to claim 22 wherein ground switch means is mounted in said housing for engaging at least one of said feeder contacts, and interlocking means in said housing connected between said ground switch means and said feeder switch blades prevent closing of said ground switch means when either of said feeder switch blades is in closed position and closing of either of said switch blades when said ground switch means engages one of said feeder contacts.

31. The switchgear according to claim 22 wherein each feeder switch blade is arranged to carry current between each feeder contact and said fuse and to interrupt said current and to close on said current, and current interrupter means mounted on each feeder contact cooperate with the respective feeder switch blade to extinguish the arc incident to its movement to open position.

32. The switchgear according to claim 31 wherein each operating mechanism includes an overcenter spring mechanism connected to the respective switch blade for moving it with a snap action into and out of engagement with the respective feeder contact.

33. The switchgear according to claim 31 wherein said current interrupter means comprises a pair of plates between which the respective switch blade moves and from which an arc extinguishing medium is evolved due to the heat of the arc incident to circuit opening or closing, and vent means in said plates placing the space therebetween in communication with the atmosphere to relieve pressure generated by said arc.

References Cited

UNITED STATES PATENTS 1,402,123 1/1922 Wadsworth ---------- 200—114

ROBERT K. SCHAEFER, *Primary Examiner.*

M. GINSBURG, *Assistant Examiner.*

UNITED STATES PATENT OFFICE
CERTIFICATE OF CORRECTION

Patent No. 3,339,118 August 29, 1967

Robert H. Harner et al.

It is hereby certified that error appears in the above numbered patent requiring correction and that the said Letters Patent should read as corrected below.

Column 18, lines 13 and 14, for

"switch includes
a first locking cam"

read

-- switch,
each interlocking means includes
a first locking cam --;

column 19, claim 13 should appear as shown below instead of as in the patent:

13. The switchgear according to claim 1 wherein said drawer includes
a front wall member with a pair of side members extending therefrom into said metallic housing,
a fuse holder of insulating material secured to and extending between said side members, and
clamp and centering means on said fuse holder for detachably securing said fuse thereon in predetermined position,
track means in said metallic housing support said side members for movement of said drawer into and out of said housing,
said feeder switch blade is connected to said other fuse terminal by contact means secured thereto and having detachable contact engagement with said switch blade.

same column 19, claim 15 should appear as shown below instead of as in the patent:

15. Switchgear according to claim 1 wherein means is provided for use with a polyphase circuit and includes for each additional phase arranged as aforesaid a load contact, a fuse, a feeder switch blade, and insulating barrier means between the respective phases, and said operating mechanism is connected to said switch blades to rotate them conjointly.

Signed and sealed this 17th day of September 1968.

(SEAL)
Attest:

EDWARD M.FLETCHER,JR.
Attesting Officer

EDWARD J. BRENNER
Commissioner of Patents